United States Patent
Furuya et al.

[11] Patent Number: 5,219,810
[45] Date of Patent: Jun. 15, 1993

[54] CERAMIC COMPOSITION

[75] Inventors: Mitsuru Furuya; Toru Mori; Atsushi Ochi, all of Tokyo, Japan

[73] Assignee: NEC Corporation, Tokyo, Japan

[21] Appl. No.: 865,276

[22] Filed: Apr. 8, 1992

[30] Foreign Application Priority Data

Apr. 12, 1991 [JP] Japan ................... 3-106467
Apr. 12, 1991 [JP] Japan ................... 3-106468

[51] Int. Cl.$^5$ .................................. C04B 35/46
[52] U.S. Cl. .......................... 501/136; 501/135
[58] Field of Search ...................... 501/135, 136

[56] References Cited

U.S. PATENT DOCUMENTS 4,712,156 12/1987 Bardhan .................. 501/135
4,791,078 12/1988 Saito et al. ................ 501/136

FOREIGN PATENT DOCUMENTS 58-161972 9/1983 Japan .
2123063 6/1987 Japan .
2123064 6/1987 Japan .
3117959 5/1988 Japan .
2009760 1/1990 Japan .

Primary Examiner—Mark L. Bell
Assistant Examiner—Deborah Jones
Attorney, Agent, or Firm—Leydig, Voit & Mayer

[57] ABSTRACT

A ceramic composition is herein disclosed, which is a lead-type perovskite compound capable of being subjected to low temperature-sintering among ceramic compositions for use in making capacitors, which has a high dielectric constant, low temperature-dependency thereof and a low decrease in capacitance upon application of a DC bias and which comprises a ternary system comprising lead magnesium niobate ($Pb(Mg_{\frac{1}{3}}Nb_{\frac{2}{3}})O_3$), lead nickel niobate ($Pb(Ni_{\frac{1}{3}}Nb_{\frac{2}{3}})O_3$) and lead titanate ($PbTiO_3$)$_z$ or a ternary system comprising lead magnesium tungstate ($Pb(Mg_{\frac{1}{2}}W_{\frac{1}{2}})O_3$) lead titanate ($PbTiO_3$) and lead nickel niobate ($Pb(Ni_{\frac{1}{3}}Nb_{\frac{2}{3}})O_3$) and a desired amount of lanthanum manganese niobate $La(Mn_{\frac{1}{3}}Nb_{\frac{2}{3}})O_3$) incorporated into the ternary system or a predetermined amount of $La^{3+}$ or $Ca^{2+}$ ions with which the $Pb^{2+}$ ions present in the ternary system are substituted.

10 Claims, 12 Drawing Sheets

—— La³⁺-SUBSTITUTION : 10 mole %

—·— La³⁺-SUBSTITUTION : 30 mole %

----- NO SUBSTITUTION

CERAMIC COMPOSITION

BACKGROUND OF THE INVENTION

1. Field of the Invention

The present invention relates to a ceramic composition and in particular to a ceramic composition which has a high dielectric constant and a low rate of variation in dielectric constant with temperature and which is capable of being sintered at a low temperature in the order of 1050° to 1100° C. or lower.

2. Description of the Prior Art

When a multilayer capacitor is formed from a ceramic composition, the ceramic composition should be selected so that it satisfies several requirements such that it should have a dielectric constant and a specific resistivity as high as possible. Furthermore the rate of variation in dielectric constant with temperature, dielectric loss and drop in dielectric constant due to DC bias application should be as low as possible. Among ceramic compositions having high dielectric constants, those mainly comprising barium titanate ($BaTiO_3$) are well known and already put into practical use. However, they require a high sintering temperature. Accordingly, an additive such as calcium titanate ($CaTiO_3$) or lead titanate ($PbTiO_3$) is incorporated to improve the temperature-dependent characteristics however, but the sintering temperature thereof is remains on in the order of not less than 1300° C. For this reason, when the ceramic composition mainly comprising barium titanate is used in making a multilayer ceramic capacitor, materials for internal electrodes thereof are limited. More particularly, the internal electrode specific expensive materials such as noble metals (e.g., platinum and palladium) which can withstand such a high sintering temperature. Further, the dielectric constant achieved by these dielectric ceramic compositions is at highest about 8000. The dielectric constant thereof may be increased, but, in this case, variation thereof with temperature is impaired. More specifically, these ceramic compositions simply satisfy Y5V characteristics (−30° to 85° C.; +22%, −82%) as defined in the EIA Standards.

Although a ceramic material showing a low rate of variation in dielectric constant with temperature can be produced from the conventional material, the dielectric constant of the resulting ceramic composition is too low (in the order of about 2000) to use as a material for capacitors.

As has been discussed above, to reduce the expenses for producing multilayer ceramic capacitors, it is necessary to develop a ceramic composition capable of being sintered at a low temperature of the order of not more than 1050° C., which makes it possible to use cheaper materials for internal electrodes of capacitors such as those mainly comprising siver or nickel. Recently, there have been proposed various lead-based composite perovskite type compounds having low sintering temperatures and high dielectric constants. For instance, a ternary composition comprising lead magnesium niobate ($Pb(Mg_{\frac{1}{3}}Nb_{\frac{2}{3}})O_3$), lead nickel niobate ($Pb(Ni_{\frac{1}{3}}Nb_{\frac{2}{3}})O_3$) and lead titanate ($PbTiO_3$) can achieve a dielectric constant at room temperature of not less than 10000 (see U.S. Pat. No. 4,712,156). In addition, Japanese Unexamined Patent Publication No. Sho 58-161972 discloses that a ternary composition comprising lead magnesium tungstate ($Pb(Mg_{\frac{1}{2}}W_{\frac{1}{2}})O_3$), lead titanate ($PbTiO_3$) and lead nickel niobate ($Pb(Ni_{\frac{1}{3}}Nb_{\frac{2}{3}})O_3$) can likewise achieve a dielectric constant of not less than 10000. However, these three-component systems suffer from a problem of high temperature-dependency of the dielectric constant. Moreover, the dielectric constant thereof is greatly reduced upon application of a DC bias and correspondingly, the resulting capacitors are greatly limited in their applications.

SUMMARY OF THE INVENTION

Accordingly, an object of the present invention is to provide a ceramic composition which comprises the foregoing three-component system and exhibits a high dielectric constant, a relatively low temperature-dependency thereof and a small drop in dielectric constant upon application of a DC bias.

The foregoing and other objects and features of the present invention will be apparent from the following description.

According to a first aspect of the present invention, there is provided a ceramic composition which comprises, as a major constituent, a ternary system essentially consisting of lead magnesium niobate ($Pb(Mg_{\frac{1}{3}}Nb_{\frac{2}{3}})O_3$), lead nickel niobate ($Pb(Ni_{\frac{1}{3}}Nb_{\frac{2}{3}})O_3$) and lead titanate [$PbTiO_3$] and being expressed by the following general formula $(Pb(Mg_{\frac{1}{3}}Nb_{\frac{2}{3}})O_3)_x(Pb(Ni_{\frac{1}{3}}Nb_{\frac{2}{3}})O_3)_y(PbTiO_3)_z$ wherein the subscripts x, y and z satisfy the following relation: $x+y+z=1.0$ and fall within the range defined by and be on the line segments joining the following seven points (a) to (g) which are given by the coordinates:

| | | | |
|---|---|---|---|
| (x = 0.10, | y = 0.70, | z = 0.20) | (a) |
| (x = 0.10, | y = 0.475, | z = 0.425) | (b) |
| (x = 0.625, | y = 0.05, | z = 0.325) | (c) |
| (x = 0.75, | y = 0.05, | z = 0.20) | (d) |
| (x = 0.75, | y = 0.15, | z = 0.10) | (e) |
| (x = 0.50, | y = 0.40, | z = 0.10) | (f) |
| (x = 0.15, | y = 0.70, | z = 0.15) | (g) | on the triangular ternary-system diagram; and, as an additive, 0.01 to 10 mole% of lanthanum manganese niobate ($La(Mn_{\frac{2}{3}}Nb_{\frac{1}{3}})O_3$).

According to a second aspect of the present invention, there is provided a ceramic composition which comprises, as a major constituent, a ternary system essentially consisting of lead magnesium tungstate ($Pb(Mg_{\frac{1}{2}}W_{\frac{1}{2}})O_3$), lead titanate ($PbTiO_3$) and lead nickel niobate ($Pb(Ni_{\frac{1}{3}}Nb_{\frac{2}{3}})O_3$) and being expressed by the following general formula $(Pb(Mg_{\frac{1}{2}}W_{\frac{1}{2}})O_3)_x[PbTiO_3]_y(Pb(Ni_{\frac{1}{3}}Nb_{\frac{2}{3}})O_3)_z$ wherein the subscripts x, y and z satisfy the following relation: $x+y+z=1.0$ and fall within the range defined by and be on the line segments joining the following four points (h) to (k) which are given by the coordinates:

| | | | |
|---|---|---|---|
| (x = 0.693, | y = 0.297, | z = 0.01) | (h) |
| (x = 0.39, | y = 0.60, | z = 0.01) | (i) |
| (x = 0.05, | y = 0.55, | z = 0.40) | (j) |
| (x = 0.06, | y = 0.24, | z = 0.70) | (k) | on the triangular ternary-system diagram; and, as an additive, 0.01 to 10 mole% of lanthanum manganese niobate ($La(Mn_{\frac{2}{3}}Nb_{\frac{1}{3}})O_3$).

According to a third aspect of the present invention, there is provided a ceramic composition which comprises, as a major constitutent, a ternary system essentially consisting of lead magnesium niobate ($Pb(Mg_{\frac{1}{3}}Nb$-

$)O_3)$, lead nickel niobate (Pb(Ni$_{\frac{1}{3}}$Nb$_{\frac{2}{3}}$)O$_3$) and lead titanate (PbTiO$_3$) and being expressed by the following general formula: (Pb(Mg$_{\frac{1}{3}}$Nb$_{\frac{2}{3}}$)O$_3$)$_x$ (Pb(Ni$_{\frac{1}{3}}$Nb$_{\frac{2}{3}}$)O$_3$)$_y$(PbTiO$_3$)$_z$ wherein the subscripts x, y and z satisfy the following relation: $x+y+z=1.0$ and fall within the range defined by and be on the line segments joining the following seven points (a) to (g) which are given by the coordinates:

| | | | |
|---|---|---|---|
| (x = 0.10, | y = 0.70, | z = 0.20) | (a) |
| (x = 0.10, | y = 0.475, | z = 0.425) | (b) |
| (x = 0.625, | y = 0.05, | z = 0.325) | (c) |
| (x = 0.75, | y = 0.05, | z = 0.20) | (d) |
| (x = 0.75, | y = 0.15, | z = 0.10) | (e) |
| (x = 0.50, | y = 0.40, | z = 0.10) | (f) |
| (x = 0.15, | y = 0.70, | z = 0.15) | (g) | on the triangular ternary-system diagram; and in which 0.01 to 30 mole% of lead ions (Pb$^{2+}$) of the major constituent are substituted with lanthanum ions (La$^{3+}$).

According to a fourth aspect of the present invention, there is provided a ceramic composition which comprises, as a major constituent, a ternary system: essentially consisting of lead magnesium tungstate (Pb(Mg$_{\frac{1}{2}}$W$_{\frac{1}{2}}$)O$_3$), lead titanate (PbTiO$_3$) and lead nickel niobate (Pb(Ni$_{\frac{1}{3}}$Nb$_{\frac{2}{3}}$)O$_3$) and being expressed by the following general formula: (Pb(Mg$_{\frac{1}{2}}$W$_{\frac{1}{2}}$)O$_3$)$_x$(PbTiO$_3$)$_y$(Pb(Ni$_{\frac{1}{3}}$Nb$_{\frac{2}{3}}$)O$_3$)$_z$ wherein the subscripts x, y and z satisfy the following relation: $x+y+z=1.0$ and fall within the range defined by and be on the line segments joining the following four points (h) to (k) which are given by the coordinates:

| | | | |
|---|---|---|---|
| (x = 0.693, | y = 0.297, | z = 0.01) | (h) |
| (x = 0.39, | y = 0.60, | z = 0.01) | (i) |
| (x = 0.05, | y = 0.55, | z = 0.40) | (j) |
| (x = 0.06, | y = 0.24, | z = 0.70) | (k) | on the triangular ternary-system diagram; and in which 0.01 to 30 mole% of lead ions (Pb$^{2+}$) of the major constituent are substituted with lanthanum ions (La$^{3+}$).

According to a fifth aspect of the present invention, there is provided a ceramic composition which comprises, as a major constituent, a ternary system essentially consisting of lead magnesium tungstate [Pb(Mg$_{\frac{1}{2}}$W$_{\frac{1}{2}}$)O$_3$], lead titanate (PbTiO$_3$) and lead nickel niobate (Pb(Ni$_{\frac{1}{3}}$Nb$_{\frac{2}{3}}$)O$_3$) and being expressed by the following general formula (Pb(Mg$_{\frac{1}{2}}$W$_{\frac{1}{2}}$)O$_3$)$_x$(PbTiO$_3$)$_y$ (Pb(Ni$_{\frac{1}{3}}$Nb$_{\frac{2}{3}}$)O$_3$)$_z$ wherein the subscripts x, y and z satisfy the following relation: $x+y+z=1.0$ and fall within the range defined by and be on the line segments joining the following four points (h) to (k) which are given by the coordinates:

| | | | |
|---|---|---|---|
| (x = 0.693, | y = 0.297, | z = 0.01) | (h) |
| (x = 0.39, | y = 0.60, | z = 0.01) | (i) |
| (x = 0.05, | y = 0.55, | z = 0.40) | (j) |
| (x = 0.06, | y = 0.24, | z = 0.70) | (k) | on the triangular ternary-system diagram; and in which 0.01 to 30 mole% of lead ions (Pb$^{2+}$) are substituted with calcium ions (Ca$^{2+}$)

DESCRIPTION OF THE PREFERRED EMBODIMENTS

Figure 1:
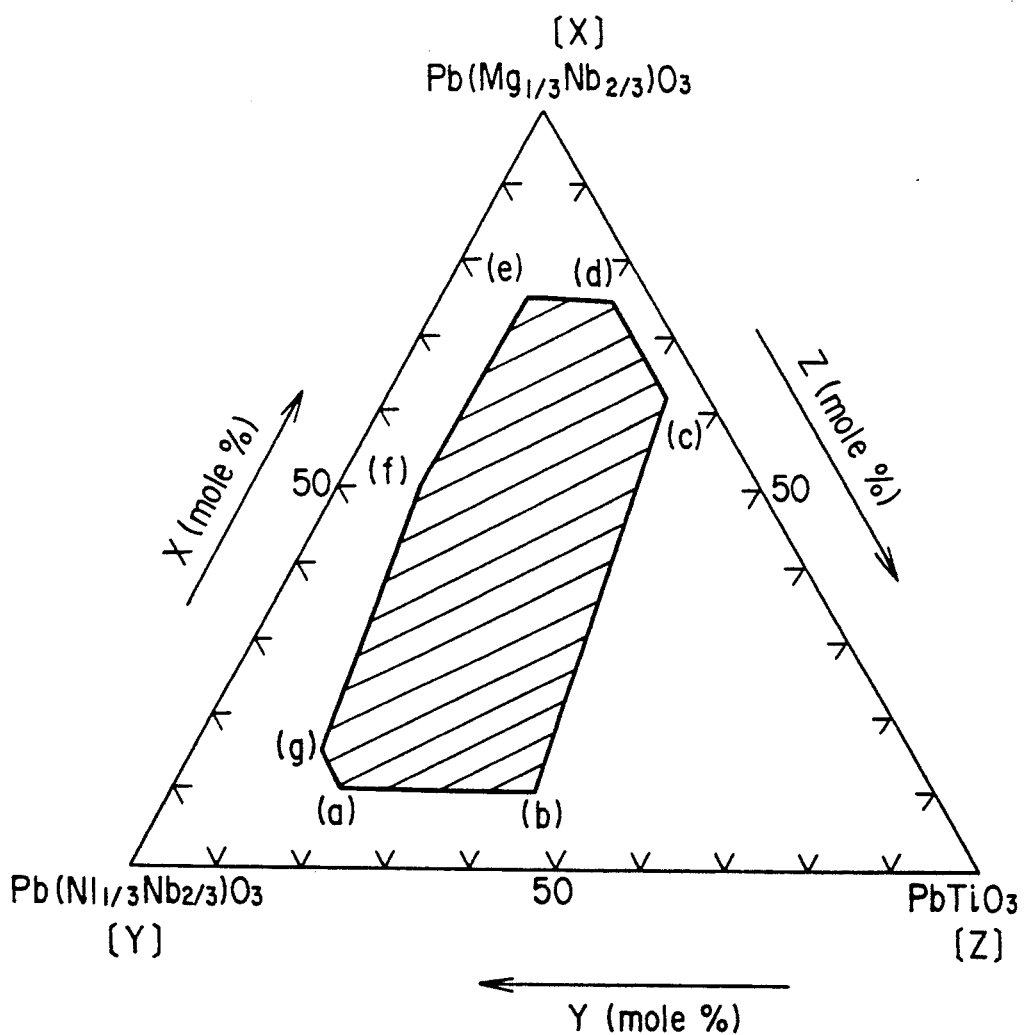
FIG. 1 is the ternary-system diagram for Pb(Mg$_{\frac{1}{3}}$Nb$_{\frac{2}{3}}$)O$_3$-Pb(Ni$_{\frac{1}{3}}$Nb$_{\frac{2}{3}}$)O$_3$-PbTiO$_3$ showing the acceptable compositional range of the major constituent of the ceramic composition according to the present invention.
Figure 2:
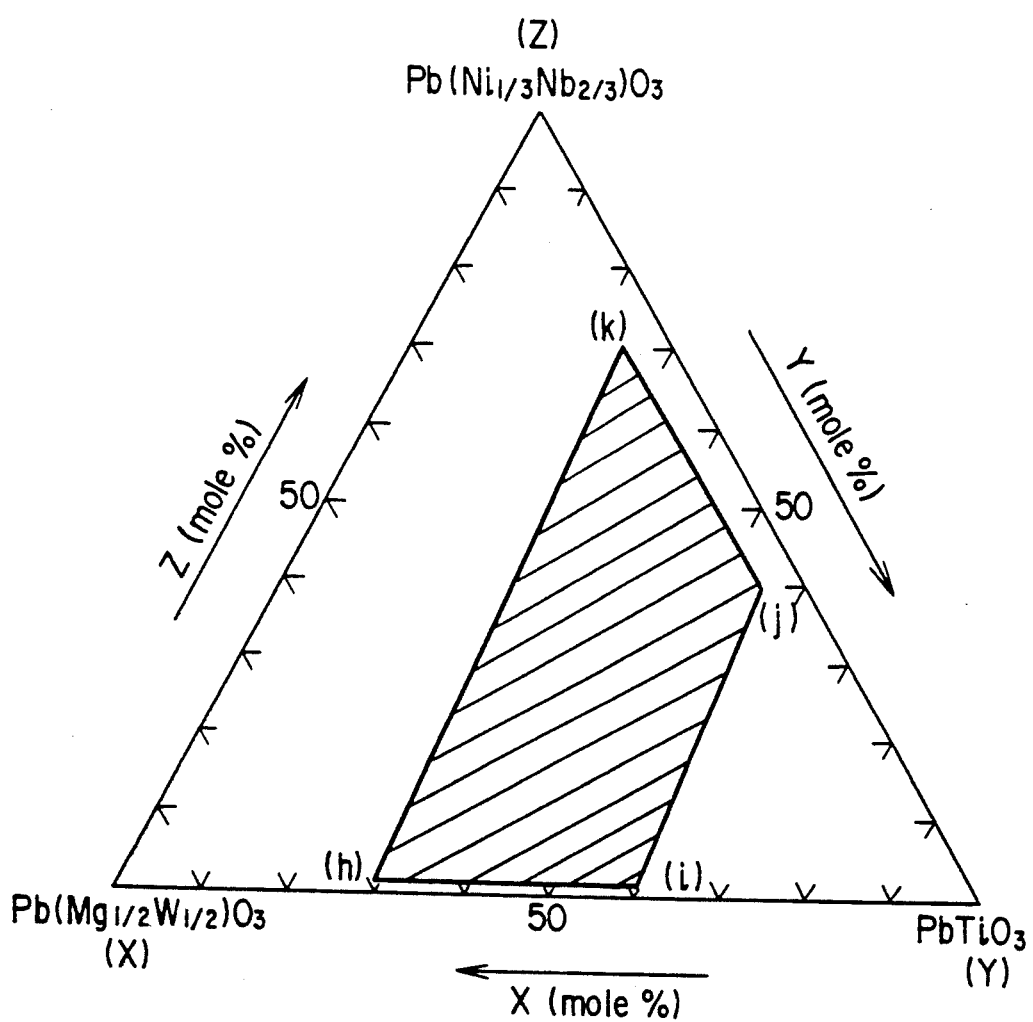
FIG. 2 is the ternary-system diagram for Pb(Mg$_{\frac{1}{2}}$W$_{\frac{1}{2}}$)O$_3$-PbTiO$_3$-Pb(Ni$_{\frac{1}{3}}$Nb$_{\frac{2}{3}}$)O$_3$ showing the acceptable compositional range of the major constituent of the ceramic composition according to the present invention.

The ternary-system diagram of the $Pb(Mg_{\frac{1}{3}}Nb_{\frac{2}{3}})O_3$-$Pb(Ni_{\frac{1}{3}}Nb_{\frac{2}{3}})O_3$-$PbTiO_3$ system, illustrating the acceptable compositional range of the major constituent of the ceramic composition according to one aspect of the present invention is shown in FIG. 1 and that of the $Pb(Mg_{\frac{1}{2}}W_{\frac{1}{2}})O_3$-$PbTiO_3$-$Pb(Ni_{\frac{1}{3}}Nb_{\frac{2}{3}})O_3$ system showing the acceptable compositional range of the major constituent of the ceramic composition according to another aspect of the present invention is shown in FIG. 2. In each of FIGS. 1 and 2, (a) to (g) or (h) to (k) are coordinates in the ternary-system diagram and the acceptable compositional range is shown as the shadowed portion including the boundary lines.

In the first and second aspects of the present invention, the amount of lanthanum manganese niobate: $La(Mn_{\frac{1}{3}}Nb_{\frac{2}{3}})O_3$ to be incorporated into the cramic composition ranges from 0.01 to 10 mole% and preferabley 2 to 8 mole%. Further, in the third and fourth aspects of the present invention, the amount of $Pb^{2+}$ ions to be substituted with $La^{3+}$ ions ranges from 0.01 to 30 mole% and preferably 2 to 20 mole%. Moreover, the amount of $Pb^{2+}$ ions to be substituted with $Ca^{2+}$ ions ranges from 0.01 to 30 mole% and preferabley 2 to 20 mole%.

The present invention will hereinafter be described in more detail with reference to the following non-limiting working Examples and the effects practically achieved by the present invention will also be discussed in detail in comparison with Comparative Examples.

EXAMPLE 1

In this Example, there were used, as starting materials, lead oxide (PbO), magnesium oxide (MgO), niobium oxide ($Nb_2O_5$), nickel oxide (NiO), titanium oxide ($TiO_2$), manganese carbonate ($MnCO_3$) and lanthanum oxide ($La_2O_3$) and these starting materials were weighed so as to satisfy the compounding ratio as shown in Tables 1 to 3. These weighed starting materials were subjected to wet-milling and mixed in a ball mill, calcined at 750° to 800° C., followed by re-milling of the resulting powder in a ball mill, filtration, drying, addition of an organic binder, sizing and pressing to give cylindrical samples having a diameter of about 16 mm and a thickness of about 10 mm as well as disk-like samples having a diameter of about 16 mm and a thickness of about 2 mm. Then these samples having desired compositions were fired at a temperature ranging from 1000° to 1100° C. for one hour.

Silver electrodes were printed onto both faces of the fired disk-like samples at 600° C. and the capacitance thereof was determined at a frequency of 1 KHz, a voltage of 1 V r.m.s. and room temperature using a digital LCR meter to obtain dielectric constants and variation thereof with temperature.

To evaluate the mechanical strength of the samples in terms of the bending strength thereof, each fired cylinder was cut into 10 rectangular plates having a thickness (t) of 0.5 mm, a width (W) of 2 mm and a length of about 13 mm. The span (l) was set at 9 mm, the fracture loads $P_m$ (kg) were determined in accordance with the three-point bending test and the bending strength $\tau$ (kg/cm$^2$) was obtained from the following relation: $\tau = 3P_m l/2Wt^2$ (kg/cm$^2$). Each bending strength obtained was an average of those for the 10 rectangular plates.

Tables 1 to 3 and 4 to 6 show the compounding ratio: x, y and z of the main constituent: $[Pb(Mg_{\frac{1}{3}}Nb_{\frac{2}{3}})O_3]_x[Pb(Ni_{\frac{1}{3}}Nb_{\frac{2}{3}})O_3]_y[PbTiO_3]_z$ of the resulting ceramic composition, the amount of the additive added, the dielectric constant, the bending strength, and the ratio of the variations of dielectric constants determined at −30° C. and 85° C. In these Tables, asterisk (*) means that the compounding ratio of the major constituent of the corresponding sample is beyond the range defined in the present invention. Moreover, each variation in dielectric constant is a value relative to the dielectric constant determined at 20° C.

Figure 3:
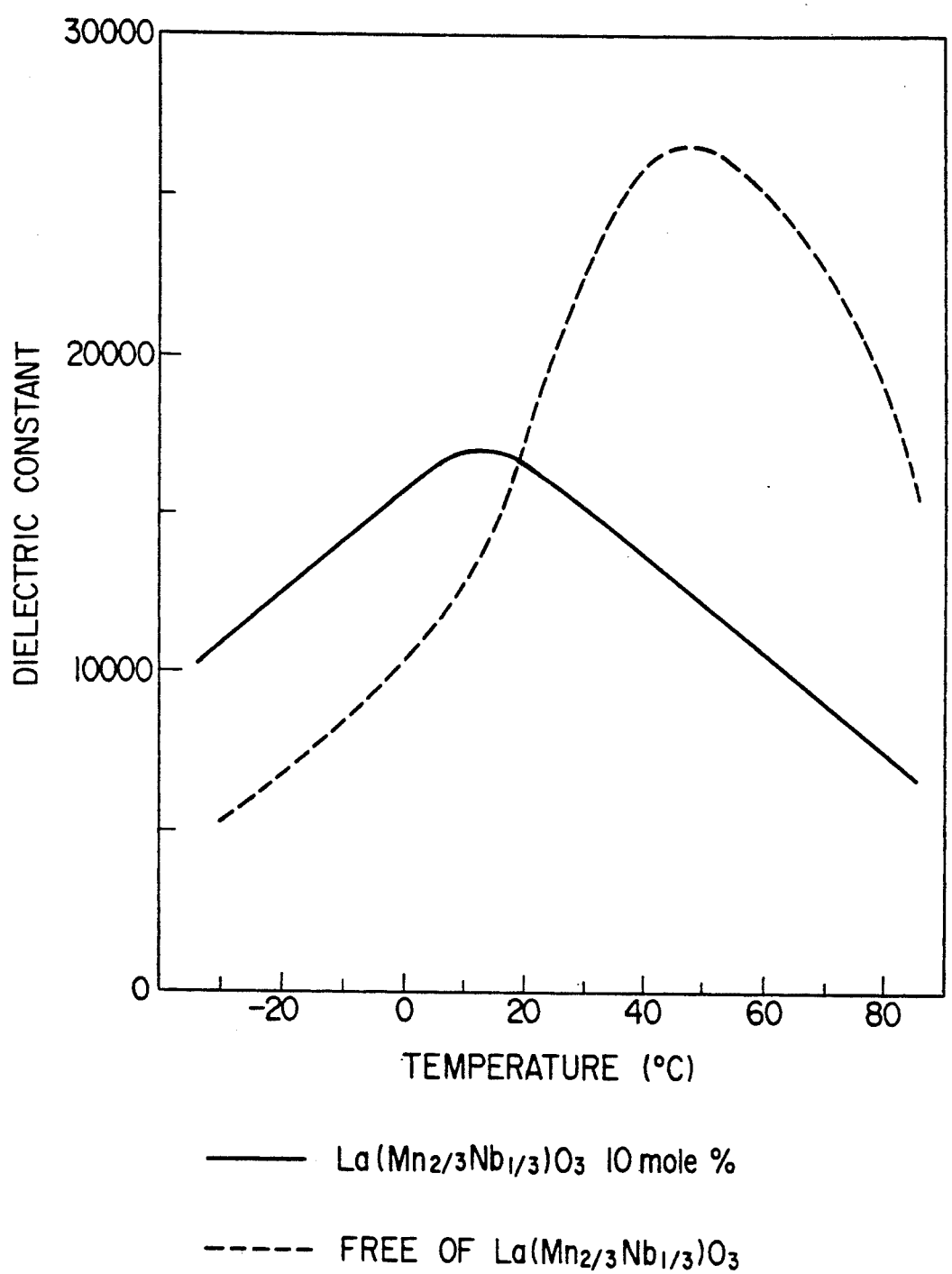
FIG. 3 is a graph showing the temperature-dependency of the dielectric constant of an embodiment of the ceramic composition according to the present invention in which x, y and z are 0.5, 0.3 and 0.2 respectively and the amount of lanthanum manganese niobate (La(Mn$_{\frac{1}{3}}$Nb$_{\frac{2}{3}}$)O$_3$) incorporated is 0 or 10 mole%.

Moreover, to make clear the effect of the addition of lanthanum manganese niobate $[La(Mn_{\frac{1}{3}}Nb_{\frac{2}{3}})O_3]$, there is shown, in FIG. 3, the temperature-dependncy of the dielectric constants of ceramic compositions whose compounding ratio (x, y, z) was (0.5, 0.3, 0.2) and in which the amount of lanthanum manganese niobate $[La(Mn_{\frac{1}{3}}Nb_{\frac{2}{3}})O_3]$ was 0 and 10 mole%.

TABLE 1

Compounding Ratios of Sample Nos. 1 to 20

| Sample No. | Main Constituent Compounding Ratio (Mole %) | | | Additive (Mole %) |
|---|---|---|---|---|
| | $Pb(Mg_{\frac{1}{3}}Nb_{\frac{2}{3}})O_3$ | $Pb(Ni_{\frac{1}{3}}Nb_{\frac{2}{3}})O_3$ | $PbTiO_3$ | $La(Mn_{\frac{1}{3}}Nb_{\frac{2}{3}})O_3$ |
| 1* | 10 | 70 | 20 | 0 |
| 2 | 10 | 70 | 20 | 0.01 |
| 3 | 10 | 70 | 20 | 2 |
| 4 | 10 | 70 | 20 | 1 |
| 5* | 10 | 70 | 20 | 15 |
| 6* | 15 | 60 | 25 | 0 |
| 7 | 15 | 60 | 25 | 0.01 |
| 8 | 15 | 60 | 25 | 2 |
| 9 | 15 | 60 | 25 | 10 |
| 10* | 15 | 60 | 25 | 15 |
| 11* | 15 | 70 | 15 | 0 |
| 12 | 15 | 70 | 15 | 0.01 |
| 13 | 15 | 70 | 15 | 2 |
| 14 | 15 | 70 | 15 | 10 |
| 15* | 15 | 70 | 15 | 15 |
| 16* | 40 | 35 | 25 | 0 |
| 17 | 40 | 35 | 25 | 0.01 |
| 18 | 40 | 35 | 25 | 2 |
| 19 | 40 | 35 | 25 | 10 |
| 20* | 40 | 35 | 25 | 15 |

TABLE 2

Compounding Ratios of Sample Nos. 21 to 40

| Sample No. | Main Constituent Compounding Ratio (Mole %) | | | Additive (Mole %) |
|---|---|---|---|---|
| | $Pb(Mg_{\frac{1}{3}}Nb_{\frac{2}{3}})O_3$ | $Pb(Ni_{\frac{1}{3}}Nb_{\frac{2}{3}})O_3$ | $PbTiO_3$ | $La(Mn_{\frac{2}{3}}Nb_{\frac{1}{3}})O_3$ |
| 21* | 60 | 20 | 20 | 0 |
| 22 | 60 | 20 | 20 | 0.01 |
| 23 | 60 | 20 | 20 | 2 |
| 24 | 60 | 20 | 20 | 10 |
| 25* | 60 | 20 | 20 | 15 |
| 26* | 70 | 20 | 10 | 0 |
| 27 | 70 | 20 | 10 | 0.01 |
| 28 | 70 | 20 | 10 | 2 |
| 29 | 70 | 20 | 10 | 10 |
| 30* | 70 | 20 | 10 | 15 |
| 31* | 50 | 40 | 10 | 0 |
| 32 | 50 | 40 | 10 | 0.01 |
| 33 | 50 | 40 | 10 | 2 |
| 34 | 50 | 40 | 10 | 10 |
| 35* | 50 | 40 | 10 | 15 |
| 36* | 60 | 25 | 15 | 0 |
| 37 | 60 | 25 | 15 | 0.01 |
| 38 | 60 | 25 | 15 | 2 |
| 39 | 60 | 25 | 15 | 10 |
| 40* | 60 | 25 | 15 | 15 |

TABLE 3

Compounding Ratios of Sample Nos. 41 to 60

| Sample No. | Main Constituent Compounding Ratio (Mole %) | | | Additive (Mole %) |
|---|---|---|---|---|
| | $Pb(Mg_{\frac{1}{3}}Nb_{\frac{2}{3}})O_3$ | $Pb(Ni_{\frac{1}{3}}Nb_{\frac{2}{3}})O_3$ | $PbTiO_3$ | $La(Mn_{\frac{2}{3}}Nb_{\frac{1}{3}})O_3$ |
| 41* | 10 | 47.5 | 42.5 | 0 |
| 42 | 10 | 47.5 | 42.5 | 0.0 |
| 43 | 10 | 47.5 | 42.5 | 2 |
| 44 | 10 | 47.5 | 42.5 | 10 |
| 45* | 10 | 47.5 | 42.5 | 15 |
| 46* | 62.5 | 5 | 32.5 | 0 |
| 47 | 62.5 | 5 | 32.5 | 0.01 |
| 48 | 62.5 | 5 | 32.5 | 2 |
| 49 | 62.5 | 5 | 32.5 | 10 |
| 50* | 62.5 | 5 | 32.5 | 15 |
| 51* | 75 | 5 | 20 | 0 |
| 52 | 75 | 5 | 20 | 0.01 |
| 53 | 75 | 5 | 20 | 2 |
| 54 | 75 | 5 | 20 | 10 |
| 55* | 75 | 5 | 20 | 15 |
| 56* | 75 | 15 | 10 | 0 |
| 57 | 75 | 15 | 10 | 0.01 |
| 58 | 75 | 15 | 10 | 2 |
| 59 | 75 | 15 | 10 | 10 |
| 60* | 75 | 15 | 10 | 15 |

TABLE 4

Properties of Sample Nos. 1 to 20

| Sample No. | Bending Strength (kg/cm$^2$) | Dielectric Constant (room temp.) | Variation of Dielectric Constant (%) | |
|---|---|---|---|---|
| | | | −30° C. | 85° C. |
| 1* | 600 | 9500 | −52.3 | −43.2 |
| 2 | 1030 | 9100 | −50.7 | −42.1 |
| 3 | 1160 | 8700 | −48.8 | −39.5 |
| 4 | 1320 | 6950 | −46.2 | −38.1 |
| 5* | 620 | 5100 | −46.0 | −37.9 |
| 6* | 580 | 18700 | −58.7 | −27.1 |
| 7 | 1070 | 16300 | −56.8 | −26.2 |
| 8 | 1230 | 13250 | −54.3 | −25.1 |
| 9 | 1420 | 9100 | −50.1 | −22.7 |
| 10* | 590 | 6230 | −49.8 | −21.9 |
| 11* | 620 | 16250 | −53.8 | −41.2 |
| 12 | 1100 | 15300 | −52.3 | −39.9 |
| 13 | 1280 | 13750 | −49.1 | −38.5 |
| 14 | 1390 | 8670 | −46.3 | −37.2 |
| 15* | 650 | 5250 | −45.1 | −36.6 |
| 16* | 650 | 21570 | −62.5 | −15.8 |
| 17 | 1110 | 18750 | −59.1 | −13.9 |
| 18 | 1320 | 16200 | −48.8 | −12.1 |
| 19 | 1390 | 9200 | −45.5 | −11.3 |
| 20* | 680 | 6350 | −44.8 | −11.1 |

TABLE 5

Properties of Sample Nos. 21 to 40

| Sample No. | Bending Strength (kg/cm$^2$) | Dielectric Constant (room temp.) | Variation of Dielectric Constant (%) | |
|---|---|---|---|---|
| | | | −30° C. | 85° C. |
| 21* | 630 | 17500 | −65.8 | −43.2 |
| 22 | 1020 | 16300 | −64.1 | −42.7 |
| 23 | 1280 | 13150 | −61.1 | −40.1 |
| 24 | 1430 | 8800 | −55.7 | −35.2 |
| 25* | 650 | 5710 | −54.8 | −34.5 |
| 26* | 610 | 13750 | −63.1 | −48.7 |
| 27 | 980 | 12500 | −62.7 | −45.1 |
| 28 | 1190 | 9300 | −58.5 | −43.2 |
| 29 | 1350 | 7350 | −55.2 | −40.1 |

TABLE 5-continued

Properties of Sample Nos. 21 to 40

| Sample No. | Bending Strength (kg/cm²) | Dielectric Constant (room temp.) | Variation of Dielectric Constant (%) −30° C. | 85° C. |
|---|---|---|---|---|
| 30* | 660 | 5050 | −55.1 | −39.5 |
| 31* | 590 | 12300 | −48.7 | −38.5 |
| 32 | 970 | 11200 | −46.3 | −36.1 |
| 33 | 1100 | 9150 | −44.7 | −33.6 |
| 34 | 1250 | 7300 | −40.3 | −31.1 |
| 35* | 600 | 4800 | −39.9 | −30.2 |
| 36* | 620 | 14800 | −52.5 | −42.3 |
| 37 | 1050 | 13750 | −51.1 | −41.6 |
| 38 | 1210 | 10500 | −50.1 | −39.7 |
| 39 | 1370 | 7650 | −48.6 | −35.5 |
| 40* | 650 | 4700 | −47.5 | −34.9 |

TABLE 6

Properties of Sample Nos. 41 to 60

| Sample No. | Bending Strength (kg/cm²) | Dielectric Constant (room temp.) | Variation of Dielectric Constant (%) −30° C. | 85° C. |
|---|---|---|---|---|
| 41* | 760 | 4500 | −52.5 | +33.5 |
| 42 | 1010 | 4350 | −51.3 | +31.0 |
| 43 | 1130 | 4030 | −32.5 | +25.3 |
| 44 | 1250 | 3500 | −28.1 | +5.3 |
| 45* | 780 | 3200 | −26.5 | −5.5 |
| 46* | 710 | 4200 | −60.3 | +45.2 |
| 47 | 980 | 4050 | −59.5 | +44.2 |
| 48 | 1150 | 3810 | −55.1 | +25.6 |
| 49 | 1230 | 3500 | −48.2 | −15.6 |
| 50* | 810 | 3160 | −40.2 | −17.2 |
| 51* | 750 | 6300 | −55.1 | +20.1 |
| 52 | 1050 | 6210 | −54.6 | +19.5 |
| 53 | 1130 | 6100 | −51.2 | −5.5 |
| 54 | 1240 | 5500 | −48.7 | −15.3 |
| 55* | 780 | 4800 | −41.2 | −22.1 |
| 56* | 710 | 18500 | −35.6 | −55.2 |
| 57 | 970 | 17800 | −34.1 | −52.6 |
| 58 | 1050 | 15200 | −31.5 | −35.6 |
| 59 | 1125 | 13000 | −30.6 | −31.2 |
| 60* | 820 | 8600 | +11.2 | −52.5 |

EXAMPLE 2

There were used, as starting materials, lead oxide (PbO), magnesium oxide (MgO), tungsten oxide (WO$_3$), niobium oxide (Nb$_2$O$_5$), nickel oxide (NiO), titanium oxide (TiO$_2$), manganese carbonate (MnCO$_3$) and lanthanum oxide (La$_2$O$_3$) and these starting materials were weighed so as to satisfy the compounding ratio as shown in Tables 7 to 8. Then the same procedures used in Example 1 were repeated to give cylindrical samples as well as disk-like samples and the samples were fired at a temperature rainging from 1000° to 1050° C. for one hour.

In the same manner used in Example 1, the dielectric constant, variation thereof with temperature and bending strength of each sample were determined. Tables 7 to 8 and 9 to 10 show the compounding ratio: x, y and z of the main constituent: (Pb(Mg$_\frac{1}{2}$W$_\frac{1}{2}$)O$_3$)$_x$(PbTiO$_3$)$_y$[Pb(Ni$_\frac{1}{3}$Nb$_\frac{2}{3}$)O$_3$]$_z$ of the resulting ceramic composition, the amount of the additive added, the dielectric constant, the bending strength, and the variations of dielectric constants determined at −30° C. and 85° C. In these Tables, asterisk (*) means that the compounding ratio of the major constituent of the corresponding sample is beyond the range defined in the present invention. Moreover, each variation in dielectric constant is a value relative to the dielectric constant determined at 20° C.

Figure 4:
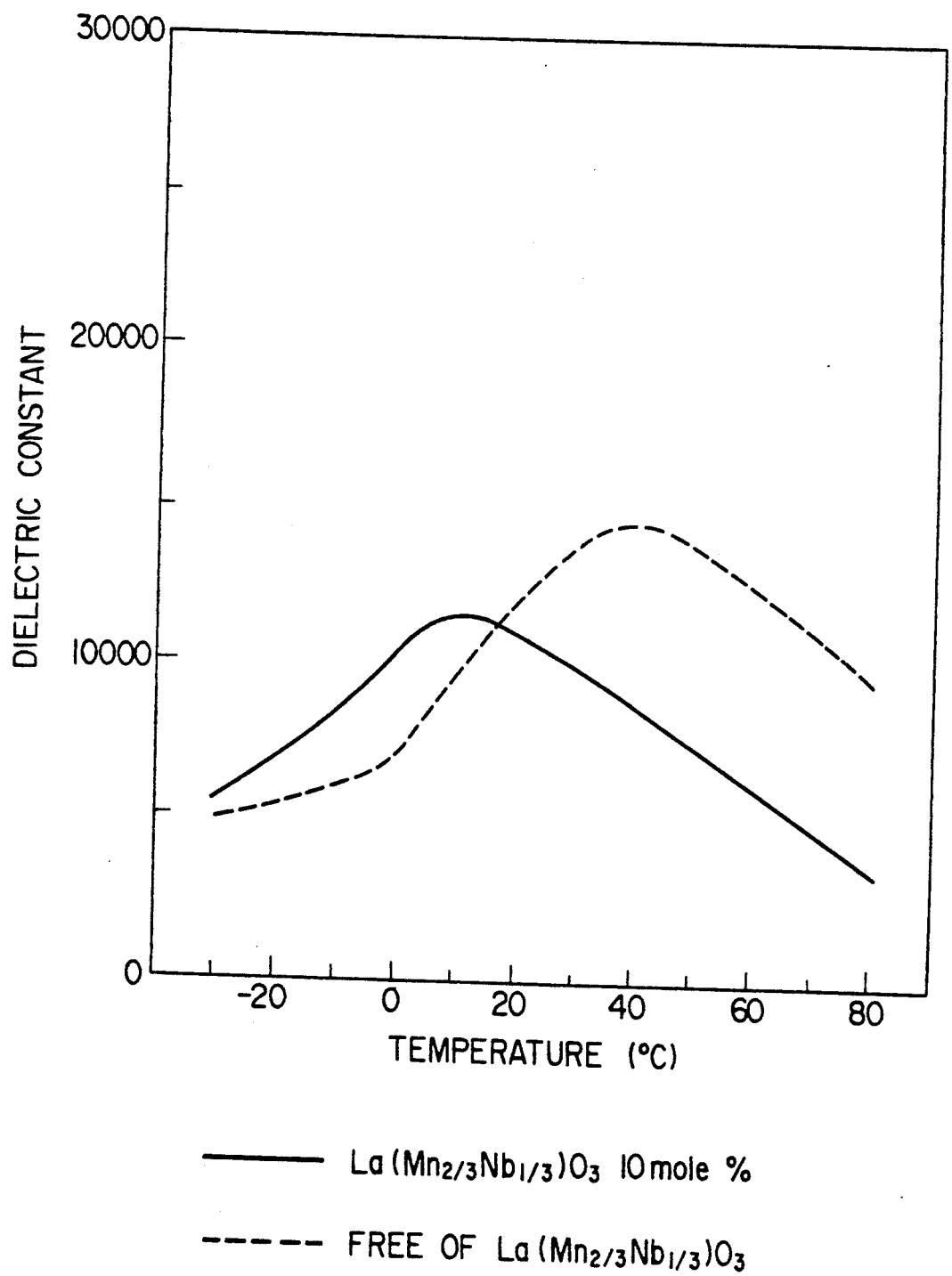
FIG. 4 is a graph showing the temperature-dependency of the dielectric constant of another embodiment of the ceramic composition according to the present invention in which x, y and z are 0.2, 0.4 and 0.4 respectively and the amount of lanthanum manganese niobate (La(Mn$_{\frac{1}{3}}$Nb$_{\frac{2}{3}}$)O$_3$) incorporated is 0 or 10 mole%.

Moreover, to make clear the effect of the addition of lanthanum manganese niobate (La(Mn$_\frac{2}{3}$Nb$_\frac{1}{3}$)O$_3$), there is shown, in FIG. 4, the temperature-dependncy of the dielectric constants of ceramic compositions whose compounding ratio (x, y, z) was (0.2, 0.4, 0.4) and in which the amount of lanthanum manganese niobate [La(Mn$_\frac{2}{3}$Nb$_\frac{1}{3}$)O$_3$] was 0 and 10 mole%.

TABLE 7

Compounding Ratios of Sample Nos. 61 to 80

| Sample No. | Main Constituent Compounding Ratio (Mole %) | | | Additive (Mole %) |
|---|---|---|---|---|
| | Pb(Mg$_\frac{1}{2}$W$_\frac{1}{2}$)O$_3$ | Pb(Ni$_\frac{1}{3}$Nb$_\frac{2}{3}$)O$_3$ | PbTiO$_3$ | La(Mn$_\frac{2}{3}$Nb$_\frac{1}{3}$)O$_3$ |
| 61* | 69.3 | 1 | 29.7 | 0 |
| 62 | 69.3 | 1 | 29.7 | 0.01 |
| 63 | 69.3 | 1 | 29.7 | 2 |
| 64 | 69.3 | 1 | 29.7 | 10 |
| 65* | 69.3 | 1 | 29.7 | 15 |
| 66* | 49.5 | 1 | 49.5 | 0 |
| 67 | 49.5 | 1 | 49.5 | 0.01 |
| 68 | 49.5 | 1 | 49.5 | 2 |
| 69 | 49.5 | 1 | 49.5 | 10 |
| 70* | 49.5 | 1 | 49.5 | 15 |
| 71* | 19.5 | 35 | 45.5 | 0 |
| 72 | 19.5 | 35 | 45.5 | 0.01 |
| 73 | 19.5 | 35 | 45.5 | 2 |
| 74 | 19.5 | 35 | 45.5 | 10 |
| 75* | 19.5 | 35 | 45.5 | 15 |
| 76* | 10 | 50 | 40 | 0 |
| 77 | 10 | 50 | 40 | 0.01 |
| 78 | 10 | 50 | 40 | 2 |
| 79 | 10 | 50 | 40 | 10 |
| 80* | 10 | 50 | 40 | 15 |

TABLE 8

Compounding Ratios of Sample Nos. 81 to 100

| Sample No. | Main Constituent Compounding Ratio (Mole %) | | | Additive (Mole %) |
|---|---|---|---|---|
| | $Pb(Mg_{\frac{1}{2}}W_{\frac{1}{2}})O_3$ | $Pb(Ni_{\frac{1}{3}}Nb_{\frac{2}{3}})O_3$ | $PbTiO_3$ | $La(Mn_{\frac{2}{3}}Nb_{\frac{1}{3}})O_3$ |
| 81* | 6 | 70 | 24 | 0 |
| 82 | 6 | 70 | 24 | 0.01 |
| 83 | 6 | 70 | 24 | 2 |
| 84 | 6 | 70 | 24 | 10 |
| 85* | 6 | 70 | 24 | 15 |
| 86* | 30 | 30 | 40 | 0 |
| 87 | 30 | 30 | 40 | 0.01 |
| 88 | 30 | 30 | 40 | 2 |
| 89 | 30 | 30 | 40 | 10 |
| 90* | 30 | 30 | 40 | 15 |
| 91* | 39 | 1 | 60 | 0 |
| 92 | 39 | 1 | 60 | 0.01 |
| 93 | 39 | 1 | 60 | 2 |
| 94 | 39 | 1 | 60 | 10 |
| 95* | 39 | 1 | 60 | 15 |
| 96* | 5 | 40 | 55 | 0 |
| 97 | 5 | 40 | 55 | 0.01 |
| 98 | 5 | 40 | 55 | 2 |
| 99 | 5 | 40 | 55 | 10 |
| 100* | 5 | 40 | 55 | 15 |

TABLE 9

Properties of Sample Nos. 61 to 80

| Sample No. | Bending Strength (kg/cm²) | Dielectric Constant (room temp.) | Variation of Dielectric Constant (%) | |
|---|---|---|---|---|
| | | | −30° C. | 85° C. |
| 61* | 650 | 3060 | +35.2 | −42.8 |
| 62 | 1020 | 2980 | +33.8 | −41.5 |
| 63 | 1250 | 2850 | +30.5 | −36.2 |
| 64 | 1380 | 2670 | +26.5 | −31.7 |
| 65* | 620 | 1910 | +26.0 | −30.1 |
| 66* | 680 | 4530 | −52.5 | −25.3 |
| 67 | 1010 | 3870 | −51.1 | −24.8 |
| 68 | 1125 | 3510 | −50.8 | −23.6 |
| 69 | 1280 | 3050 | −45.7 | −21.8 |
| 70* | 700 | 2100 | −45.5 | −20.9 |
| 71* | 580 | 3450 | −56.5 | −12.8 |
| 72 | 980 | 2950 | −52.8 | −11.7 |
| 73 | 1260 | 2810 | −49.7 | −10.8 |
| 74 | 1410 | 2530 | −46.1 | −9.3 |
| 75* | 620 | 2050 | −45.8 | −9.0 |
| 76* | 640 | 5620 | −46.2 | −35.5 |
| 77 | 1050 | 5410 | −45.7 | −33.8 |
| 78 | 1180 | 4730 | −41.2 | −31.5 |
| 79 | 1350 | 3500 | −35.6 | −27.2 |
| 80* | 660 | 2400 | −35.1 | −26.8 |

TABLE 10

Properties of Sample Nos. 81 to 100

| Sample No. | Bending Strength (kg/cm²) | Dielectric Constant (room temp.) | Variation of Dielectric Constant (%) | |
|---|---|---|---|---|
| | | | −30° C. | 85° C. |
| 81* | 600 | 9250 | −45.2 | −43.8 |
| 82 | 980 | 9120 | −42.6 | −41.3 |
| 83 | 1230 | 8350 | −39.1 | −37.5 |
| 84 | 1360 | 6800 | −36.8 | −35.2 |
| 85* | 610 | 3850 | −36.1 | −34.3 |
| 86* | 590 | 9800 | −42.3 | −38.7 |
| 87 | 1010 | 9370 | −40.5 | −36.2 |
| 88 | 1170 | 8910 | −37.7 | −34.3 |
| 89 | 1310 | 6250 | −33.8 | −29.6 |
| 90* | 630 | 4800 | −33.1 | −28.2 |
| 91* | 610 | 4800 | −65.3 | +25.5 |
| 92 | 850 | 4750 | −64.1 | +23.2 |
| 93 | 1050 | 4500 | −56.7 | +25.3 |
| 94 | 1230 | 4320 | −48.7 | +1.5 |
| 95* | 750 | 4250 | −43.3 | −15.8 |
| 96* | 600 | 6050 | −68.3 | +35.5 |
| 97 | 810 | 5830 | −67.5 | +33.1 |
| 98 | 1030 | 5510 | −58.2 | +28.3 |
| 99 | 1260 | 4930 | −47.6 | +7.8 |
| 100* | 820 | 4610 | −43.3 | −5.5 |

As seen from the data shown in Tables 1 to 6, the ceramic composition comprising a ternary composition: $Pb(Mg_{\frac{1}{3}}Nb_{\frac{2}{3}})O_3$-$Pb(Ni_{\frac{1}{3}}Nb_{\frac{2}{3}})O_3$-$PbTiO_3$ to which 0.01 to 10 mole% of $(La(Mn_{\frac{2}{3}}Nb_{\frac{1}{3}})O_3)$ as an additive is added has a low variation of dielectric constant with temperature and a high bending strength and thus would be useful as a material for use in making multilayer ceramic capacitors.

Further, as seen from the data listed in Tables 7 to 10, the ceramic composition comprising a ternary composition: $Pb(Mg_{\frac{1}{2}}W_{\frac{1}{2}})O_3$-$PbTiO_3$-$Pb(Ni_{\frac{1}{3}}Nb_{\frac{2}{3}})O_3$ to which 0.01 to 10 mole% of $(La(Mn_{\frac{2}{3}}Nb_{\frac{1}{3}})O_3)$ as an additive is added has a low variation of dielectric constant with temperature and a high bending strength and thus would be useful as a material for use in making multilayer ceramic capacitors.

EXAMPLE 3

The same procedures used in Example 1 were repeated to give a dielectric powder having a compunding ratio: (x, y, z) in the major constituent represented by $[Pb(Mg_{\frac{1}{3}}Nb_{\frac{2}{3}})O_3]_x(Pb(Ni_{\frac{1}{3}}Nb_{\frac{2}{3}})O_3)_y(PbTiO_3)_z$ of (0.5, 0.3, 0.2) and comprising 10 mole% of lanthanum manganese niobate $(La(Mn_{\frac{2}{3}}Nb_{\frac{1}{3}})O_3)$, as an additive. The resulting dielectric powder was dispersed in an organic solvent, kneaded with an organic binder to give a slurry and the resulting slurry was formed into a film having a thickness of 40 μm according to the doctor blade technique currently used. Then a paste for internal electrode was printed on the film in accordance with the usual screen printing method, followed by stamping out, lamination, hot-pressing to give a multilayer body which was then cut into pieces having a desired shape to obtain green chips for capacitors. The resulting green chips were heated to desired temperatures to remove the binder and to fire and then silver paste was applied thereto to form external electrodes.

The capacitance of the resulting capacitor was determined at room temperature while a DC bias of 0 to 50V was applied to the multilayer ceramic capacitor using a digital multimeter. The results thus obtained are plotted in FIG. 5.

EXAMPLE 4

The same procedures used in Example 1 were repeated to give a dielectric powder having a compunding ratio: (x, y, z) in the major constituent represented by $(Pb(Mg_{\frac{1}{3}}W_{\frac{1}{3}})O_3)_x(PbTiO_3)_y(Pb(Ni_{\frac{1}{3}}Nb_{\frac{2}{3}})O_3)_z$ of (0.2, 0.4, 0.4) and comprising 10 mole% of lanthanum manganese niobate $(La(Mn_{\frac{2}{3}}Nb_{\frac{1}{3}})O_3)$ as an additive.

Further, in the same manner used in Example 3, a multilayer ceramic capacitor was produced and the behavior thereof upon applying a DC bias was determined in the same manner described in Example 3. The results obtained are plotted in FIG. 6.

COMPARATIVE EXAMPLE 1

The same procedures used in Example 3 were repeated except for using a composition having the compounding ratio (x, y, z) in the major constituent represented by $(Pb(Mg_{\frac{1}{3}}Nb_{\frac{2}{3}})O_3)_x(Pb(Ni_{\frac{1}{3}}Nb_{\frac{2}{3}})O_3)_y(PbTiO_3)_z$ of (0.2, 0.6, 0.2) and free of lanthanum manganese niobate $(La(Mn_{\frac{2}{3}}Nb_{\frac{1}{3}})O_3)$ to give a capacitor and the capacitance thereof upon applying a DC bias was determined in the same manner described in Example 3. The results obtained are plotted in FIG. 5 together with the results obtained in Example 3.

COMPARATIVE EXAMPLE 2

The same procedures used in Example 3 were repeated except for using a composition having the compounding ratio (x, y, z) in the major constituent represented by $(Pb(Mg_{\frac{1}{3}}W_{\frac{1}{3}})O_3)_x(PbTiO_3)_y(Pb(Ni_{\frac{1}{3}}Nb_{\frac{2}{3}})O_3)_z$ of (0.3, 0.4, 0.3) and free of $Pb_{2+}$-substitution to give a capacitor and the capacitance thereof upon applying a DC bias was determined in the same manner described in Example 3. The results obtained are plotted in FIG. 6 together with the results obtained in Example 4.

Figure 5:
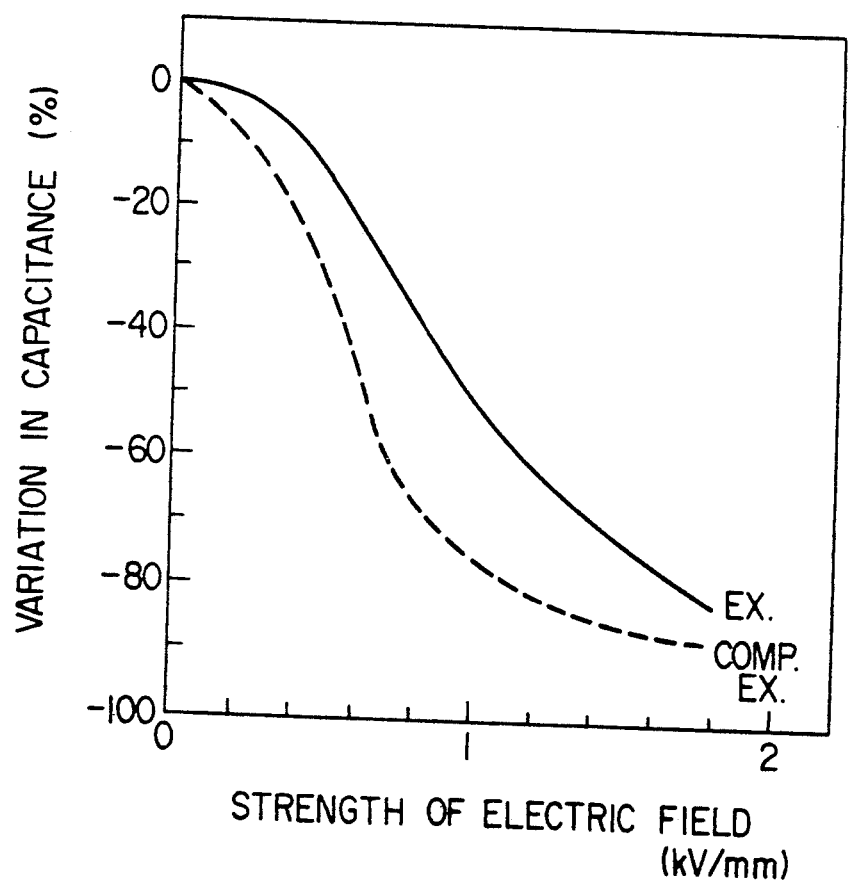
FIG. 5 is a graph in which the rate of variation in capacitance observed when a DC bias is applied to a multilayer ceramic capacitor is plotted against the strength of DC electric field per layer of the capacitor (as determined in Example 3 and Comparative Example 1)
Figure 6:
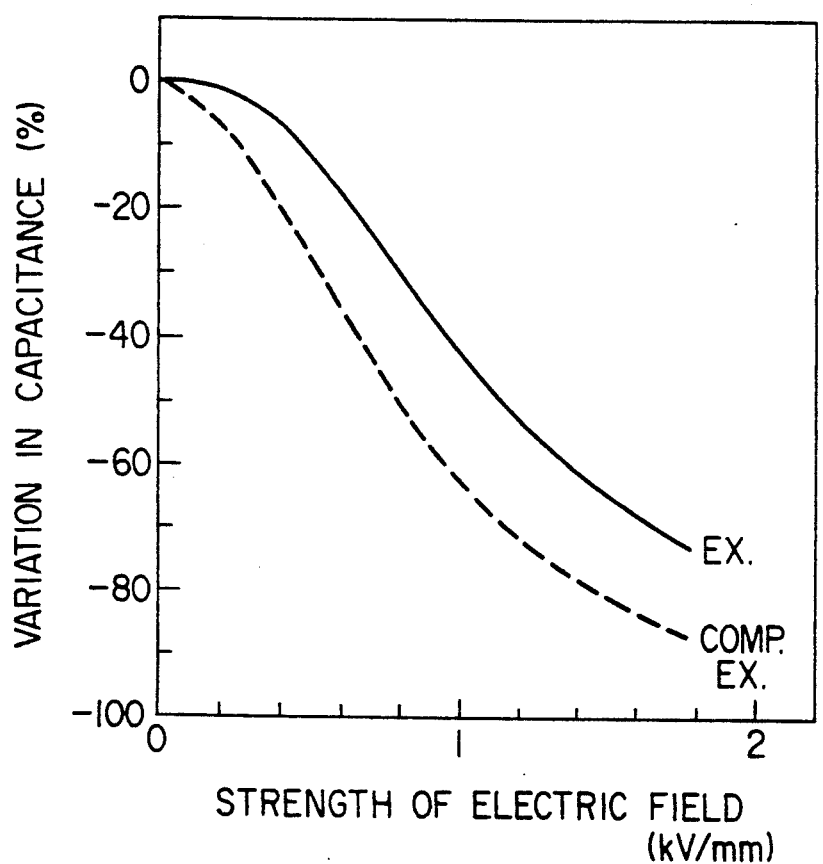
FIG. 6 is a graph is which the rate of variation in capacitance observed when a DC bias is applied to a multilayer ceramic capacitor is plotted against the strength of DC electric field per layer of the capacitor (as determine in Example 4 and Comparative Example 2)

The results shown in FIGS. 5 and 6 clearly indicate that the capacitors obtained from the lanthanum manganese niobate $(La(Mn_{\frac{2}{3}}Nb_{\frac{1}{3}}O_{3})_{1})$-containing ceramic composition of the present invention show the behavior upon application of a DC bias superior to those for the capacitors obtained using the compositions of Comparative Examples 1 and 2.

EXAMPLE 5

In this Example, there were used, as starting materials, lead oxide (PbO), magnesium oxide (MgO), niobium oxide ($Nb_2O_5$), nickel oxide (NiO), titanium oxide ($TiO_2$) and lanthanum oxide ($La_2O_3$) and these starting materials were weighed so as to satisfy the compounding ratio as shown in Tables 11 to 13. These weighed starting materials were subjected to wet-milling and mixed in a ball mill, calcined at 750° to 850° C., followed by re-milling of the resulting powder in a ball mill, filtration, drying, addition of an organic binder, sizing and pressing to give disk-like samples having a diameter of about 16 mm and a thickness of about 2 mm. Then the samples having desired compositions were fired at a temperature ranging from 1000 to 1100° C. for one hour.

Silver electrodes were printed onto both faces of the fired disk-like samples at 600° C. and the capacitance and dielectric loss thereof were determined at a frequency of 1 KHz, a voltage of 1 V r.m.s. and room temperature using a digital LCR meter to obtain dielectric constants and variation thereof with temperature. Then a voltage of 50V was applied to the samples for one minute using an insulation resistivity tester to determine insulation resistivities and to hence obtain specific resistivities.

Tables 11 to 13 and 14 to 16 show the compounding ratio: x, y and z of the major constituent: $(Pb(Mg_{\frac{1}{3}}Nb_{\frac{2}{3}})O_3)_x(Pb(Ni_{\frac{1}{3}}Nb_{\frac{2}{3}})O_3)_y(PbTiO_3)_z$ of the resulting ceramic composition, the amount of $La^{3+}$-substitution (mole%), the specific resistivity and the variations of dielectric constants determined at −30° C. and 85° C. In these Tables, asterisk (*) means that the compounding ratio of the major constituent of the corresponding sample is beyond the range defined in the present invention. Moreover, each variation in dielectric constant is a value relative to the dielectric constant determined at 20° C.

Figure 7:
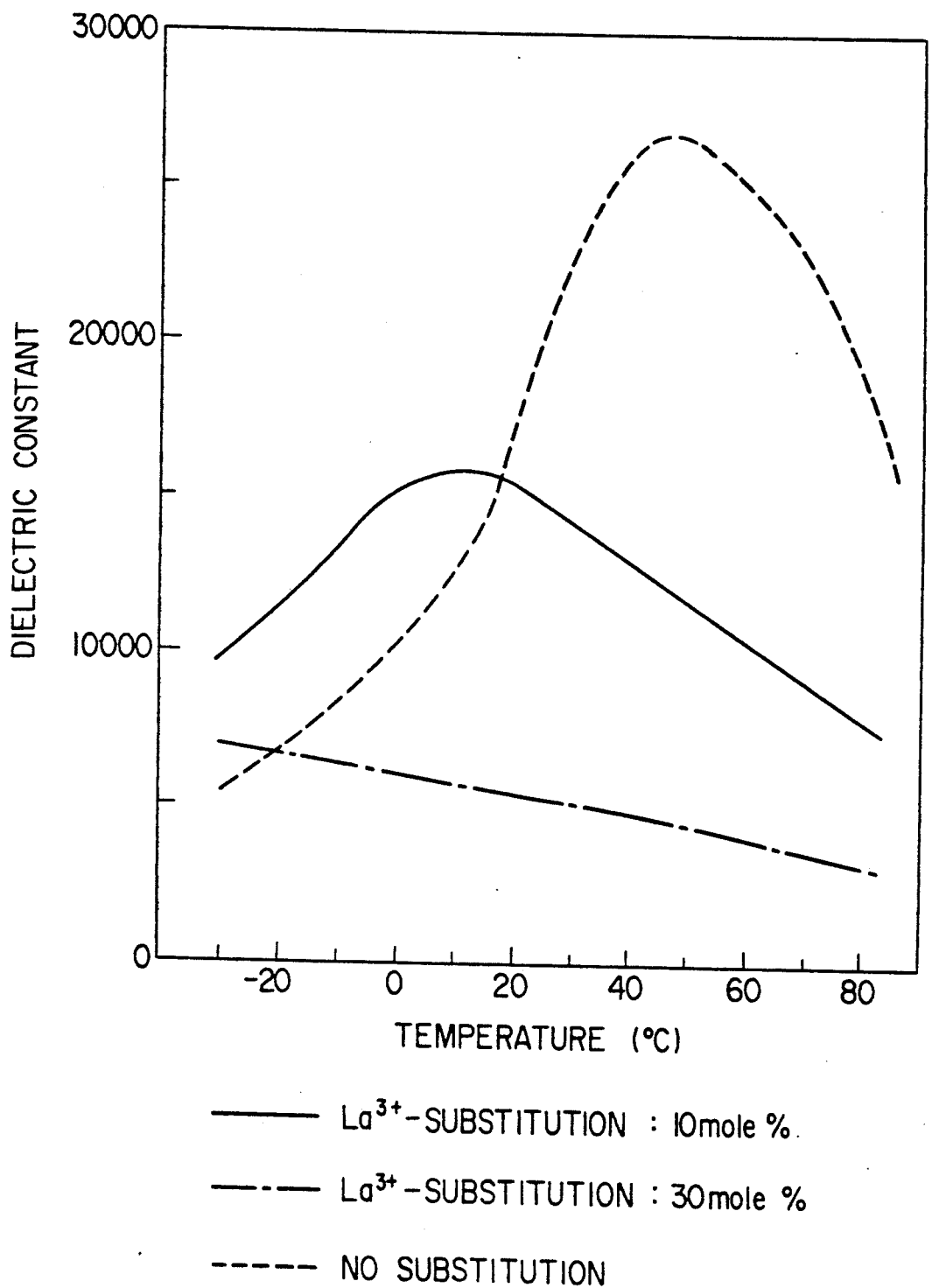
FIG. 7 is a graph showing the temperature-dependency of the dielectric constant of a further embodiemnt of the ceramic composition according to the present invention in which x, y and z are 0.5, 0.3 and 0.2 respectively and the amount of La$^{3+}$-substitution is 0, 10 or 30 mole%.

Moreover, to make clear the effect of $La^{3+}$-substitution, there is shown, in FIG. 7, the temperature-dependency of the dielectric constant of a ceramic composition whose compounding ratio (x, y, z) was (0.5, 0.3, 0.2) and in which the amount of $La^{3+}$-substitution was 0, 10 and 30 mole%.

TABLE 11

| Sample No. | Main Constituent Compounding Ratio (Mole %) | | | Amount of Substitution (Mole %) |
| --- | --- | --- | --- | --- |
| | $Pb(Mg_{\frac{1}{3}}Nb_{\frac{2}{3}})O_3$ | $Pb(Ni_{\frac{1}{3}}Nb_{\frac{2}{3}})O_3$ | $PbTiO_3$ | La |
| 1* | 10 | 70 | 20 | 0 |
| 2 | 10 | 70 | 20 | 0.01 |
| 3 | 10 | 70 | 20 | 10 |
| 4 | 10 | 70 | 20 | 30 |
| 5* | 10 | 70 | 20 | 32.5 |
| 6* | 15 | 60 | 25 | 0 |
| 7 | 15 | 60 | 25 | 0.01 |
| 8 | 15 | 60 | 25 | 10 |
| 9 | 15 | 60 | 25 | 30 |
| 10* | 15 | 60 | 25 | 32.5 |
| 11* | 15 | 70 | 15 | 0 |
| 12 | 15 | 70 | 15 | 0.01 |
| 13 | 15 | 70 | 15 | 10 |
| 14 | 15 | 70 | 15 | 30 |
| 15* | 15 | 70 | 15 | 32.5 |
| 16* | 40 | 35 | 25 | 0 |
| 17 | 40 | 35 | 25 | 0.01 |

TABLE 11-continued

Compounding Ratios of Sample Nos. 1 to 20

| Sample No. | Main Constituent Compounding Ratio (Mole %) | | | Amount of Substitution (Mole %) |
|---|---|---|---|---|
| | $Pb(Mg_{\frac{1}{3}}Nb_{\frac{2}{3}})O_3$ | $Pb(Ni_{\frac{1}{3}}Nb_{\frac{2}{3}})O_3$ | $PbTiO_3$ | La |
| 18 | 40 | 35 | 25 | 10 |
| 19 | 40 | 35 | 25 | 30 |
| 20* | 40 | 35 | 25 | 32.5 |

TABLE 12

Compounding Ratios of Sample Nos. 21 to 40

| Sample No. | Main Constituent Compounding Ratio (Mole %) | | | Amount of Substitution (Mole %) |
|---|---|---|---|---|
| | $Pb(Mg_{\frac{1}{3}}Nb_{\frac{2}{3}})O_3$ | $Pb(Ni_{\frac{1}{3}}Nb_{\frac{2}{3}})O_3$ | $PbTiO_3$ | La |
| 21* | 60 | 20 | 20 | 0 |
| 22 | 60 | 20 | 20 | 0.01 |
| 23 | 60 | 20 | 20 | 10 |
| 24 | 60 | 20 | 20 | 30 |
| 25* | 60 | 20 | 20 | 32.5 |
| 26* | 70 | 20 | 10 | 0 |
| 27 | 70 | 20 | 10 | 0.01 |
| 28 | 70 | 20 | 10 | 10 |
| 29 | 70 | 20 | 10 | 30 |
| 30* | 70 | 20 | 10 | 32.5 |
| 31* | 50 | 40 | 10 | 0 |
| 32 | 50 | 40 | 10 | 0.01 |
| 33 | 50 | 40 | 10 | 10 |
| 34 | 50 | 40 | 10 | 30 |
| 35* | 50 | 40 | 10 | 32.5 |
| 36* | 60 | 25 | 15 | 0 |
| 37 | 60 | 25 | 15 | 0.01 |
| 38 | 60 | 25 | 15 | 10 |
| 39 | 60 | 25 | 15 | 30 |
| 40* | 60 | 25 | 15 | 32.5 |

TABLE 13

Compounding Ratios of Sample Nos. 41 to 60

| Sample No. | Main Constituent Compounding Ratio (Mole %) | | | Amount of Substitution (Mole %) |
|---|---|---|---|---|
| | $Pb(Mg_{\frac{1}{3}}Nb_{\frac{2}{3}})O_3$ | $Pb(Ni_{\frac{1}{3}}Nb_{\frac{2}{3}})O_3$ | $PbTiO_3$ | La |
| 41* | 10 | 47.5 | 42.5 | 0 |
| 42 | 10 | 47.5 | 42.5 | 0.01 |
| 43 | 10 | 47.5 | 42.5 | 10 |
| 44 | 10 | 47.5 | 42.5 | 30 |
| 45* | 10 | 47.5 | 42.5 | 32.5 |
| 46* | 62.5 | 5 | 32.5 | 0 |
| 47 | 62.5 | 5 | 32.5 | 0.01 |
| 48 | 62.5 | 5 | 32.5 | 10 |
| 49 | 62.5 | 5 | 32.5 | 30 |
| 50* | 62.5 | 5 | 32.5 | 32.5 |
| 51* | 75 | 5 | 20 | 0 |
| 52 | 75 | 5 | 20 | 0.01 |
| 53 | 75 | 5 | 20 | 10 |
| 54 | 75 | 5 | 20 | 30 |
| 55* | 75 | 5 | 20 | 32.5 |
| 56* | 75 | 15 | 10 | 0 |
| 57 | 75 | 15 | 10 | 0.01 |
| 58 | 75 | 15 | 10 | 10 |
| 59 | 75 | 15 | 10 | 30 |
| 60* | 75 | 15 | 10 | 32.5 |

TABLE 14

Properties of Sample Nos. 1 to 20

| Sample No. | Specific Resistivity ($\Omega \cdot cm$) | Dielectric Constant (room temp.) | Variation of Dielectric Constant (%) | |
|---|---|---|---|---|
| | | | $-30°$ C. | $85°$ C. |
| 1* | $6.5 \times 10^{12}$ | 9500 | $-52.3$ | $-43.2$ |
| 2 | $1.3 \times 10^{13}$ | 8800 | $-48.7$ | $-41.5$ |
| 3 | $1.5 \times 10^{13}$ | 7650 | $-47.5$ | $-38.8$ |
| 4 | $2.5 \times 10^{13}$ | 6820 | $-45.2$ | $-37.5$ |
| 5* | $8.7 \times 10^{12}$ | 4200 | $-45.1$ | $-37.1$ |
| 6* | $5.3 \times 10^{12}$ | 18700 | $-58.7$ | $-27.1$ |
| 7 | $1.8 \times 10^{13}$ | 15450 | $-55.3$ | $-25.9$ |
| 8 | $1.5 \times 10^{13}$ | 12300 | $-53.8$ | $-24.8$ |

TABLE 14-continued

Properties of Sample Nos. 1 to 20

| Sample No. | Specific Resistivity ($\Omega \cdot cm$) | Dielectric Constant (room temp.) | Variation of Dielectric Constant (%) −30° C. | 85° C. |
|---|---|---|---|---|
| 9 | $3.1 \times 10^{13}$ | 8750 | −48.7 | −22.5 |
| 10* | $6.8 \times 10^{12}$ | 3200 | −48.5 | −22.3 |
| 11* | $4.3 \times 10^{12}$ | 16250 | −53.8 | −41.2 |
| 12 | $1.5 \times 10^{13}$ | 13700 | −51.5 | −38.2 |
| 13 | $1.8 \times 10^{13}$ | 11400 | −48.3 | −37.1 |
| 14 | $1.3 \times 10^{13}$ | 7650 | −45.1 | −35.5 |
| 15* | $5.8 \times 10^{12}$ | 4500 | −44.9 | −35.3 |
| 16* | $3.8 \times 10^{12}$ | 21570 | −62.5 | −15.8 |
| 17 | $1.6 \times 10^{13}$ | 17550 | −58.7 | −13.2 |
| 18 | $2.3 \times 10^{13}$ | 15300 | −47.5 | −11.7 |
| 19 | $3.1 \times 10^{13}$ | 8700 | −43.2 | −10.5 |
| 20* | $5.5 \times 10^{12}$ | 4850 | −42.8 | −10.3 |

TABLE 15

Properties of Sample Nos. 21 to 40

| Sample No. | Specific Resistivity ($\Omega \cdot cm$) | Dielectric Constant (room temp.) | Variation of Dielectric Constant (%) −30° C. | 85° C. |
|---|---|---|---|---|
| 21* | $6.8 \times 10^{12}$ | 17500 | −65.8 | −43.2 |
| 22 | $1.1 \times 10^{13}$ | 14780 | −63.8 | −41.2 |
| 23 | $1.9 \times 10^{13}$ | 11500 | −60.5 | −38.7 |
| 24 | $2.3 \times 10^{13}$ | 7600 | −52.1 | −33.1 |
| 25* | $8.7 \times 10^{12}$ | 4150 | −51.9 | −33.0 |
| 26* | $7.3 \times 10^{12}$ | 13750 | −63.1 | −48.7 |
| 27 | $1.8 \times 10^{13}$ | 11700 | −61.5 | −44.5 |
| 28 | $1.7 \times 10^{13}$ | 8630 | −57.2 | −42.1 |
| 29 | $3.0 \times 10^{13}$ | 5250 | −54.6 | −38.8 |
| 30* | $9.5 \times 10^{12}$ | 4050 | −54.4 | −38.7 |
| 31* | $7.7 \times 10^{12}$ | 12300 | −48.7 | −38.5 |
| 32 | $1.5 \times 10^{13}$ | 10500 | −45.3 | −35.2 |
| 33 | $1.3 \times 10^{13}$ | 8750 | −43.3 | −32.1 |
| 34 | $2.7 \times 10^{13}$ | 6200 | −38.8 | −30.5 |
| 35* | $8.8 \times 10^{12}$ | 3950 | −38.6 | −30.1 |
| 36* | $5.8 \times 10^{12}$ | 14800 | −52.5 | −42.3 |
| 37 | $1.2 \times 10^{13}$ | 12080 | −50.8 | −40.7 |
| 38 | $1.8 \times 10^{13}$ | 9700 | −48.7 | −38.5 |
| 39 | $2.0 \times 10^{13}$ | 6260 | −45.2 | −33.1 |
| 40* | $6.2 \times 10^{12}$ | 4020 | −45.0 | −33.0 |

TABLE 16

Properties of Sample Nos. 21 to 40

| Sample No. | Specific Resistivity ($\Omega \cdot cm$) | Dielectric Constant (room temp.) | Variation of Dielectric Constant (%) −30° C. | 85° C. |
|---|---|---|---|---|
| 41* | $5.5 \times 10^{12}$ | 4500 | −52.5 | +32.5 |
| 42 | $1.8 \times 10^{13}$ | 4800 | −50.8 | +31.1 |
| 43 | $2.3 \times 10^{13}$ | 5500 | −55.3 | −20.1 |
| 44 | $2.5 \times 10^{13}$ | 5200 | −45.1 | −50.3 |
| 45* | $7.5 \times 10^{12}$ | 5100 | −43.2 | −51.3 |
| 46* | $7.0 \times 10^{12}$ | 4200 | −60.3 | +45.2 |
| 47 | $1.1 \times 10^{13}$ | 4400 | −58.8 | +43.1 |
| 48 | $1.8 \times 10^{13}$ | 6200 | −55.6 | +18.1 |
| 49 | $2.5 \times 10^{13}$ | 5200 | −54.8 | −11.6 |
| 50* | $8.8 \times 10^{12}$ | 4950 | −50.5 | −11.0 |
| 51* | $3.8 \times 10^{12}$ | 6300 | −55.1 | +20.1 |
| 52 | $1.5 \times 10^{13}$ | 6400 | −53.2 | +16.5 |
| 53 | $1.8 \times 10^{13}$ | 7500 | −12.6 | −50.5 |
| 54 | $2.3 \times 10^{13}$ | 6800 | +20.5 | −56.5 |
| 55* | $7.6 \times 10^{12}$ | 6200 | +22.1 | −58.7 |
| 56* | $5.1 \times 10^{12}$ | 18500 | −35.6 | −55.2 |
| 57 | $8.9 \times 10^{12}$ | 17500 | −32.4 | −56.5 |
| 58 | $2.0 \times 10^{13}$ | 10000 | −10.5 | −53.8 |
| 59 | $2.5 \times 10^{13}$ | 8500 | +11.3 | −50.2 |
| 60* | $5.0 \times 10^{12}$ | 8150 | +12.5 | −50.5 |

EXAMPLE 6

There were used, as starting materials, lead oxide (PbO), magnesium oxide (MgO), tungsten oxide (WO$_3$), niobium oxide (Nb$_2$O$_5$), nickel oxide (NiO), titanium oxide (TiO$_2$) and lanthanum oxide (La$_2$O$_3$) and these starting materials were weighed so as to satisfy the compounding ratio as shown in Tables 17 to 18. Then the same procedures used in Example 1 were repeated to give disk-like samples and the samples were fired at a temperature ranging from 1000° to 1050° C. for one hour.

In the same manner used in Example 1, the dielectric constant, variation thereof with temperature, dielectric loss and specific resistivity of each sample were determined. Tables 17 to 18 and Tables 19 to 20 show the compounding ratio: x, y and z of the major constituent: $(Pb(Mg_{\frac{1}{2}}W_{\frac{1}{2}})O_3)_{x}(PbTiO_3)_{y}(Pb(Ni_{\frac{1}{3}}Nb_{2/3})O_3)_{z}$ of the resulting ceramic composition, the amount of La$^{3+}$-substitution, the specific resistivity and the variations of dielectric constants determined at −30° C. and 85° C.

Figure 8:
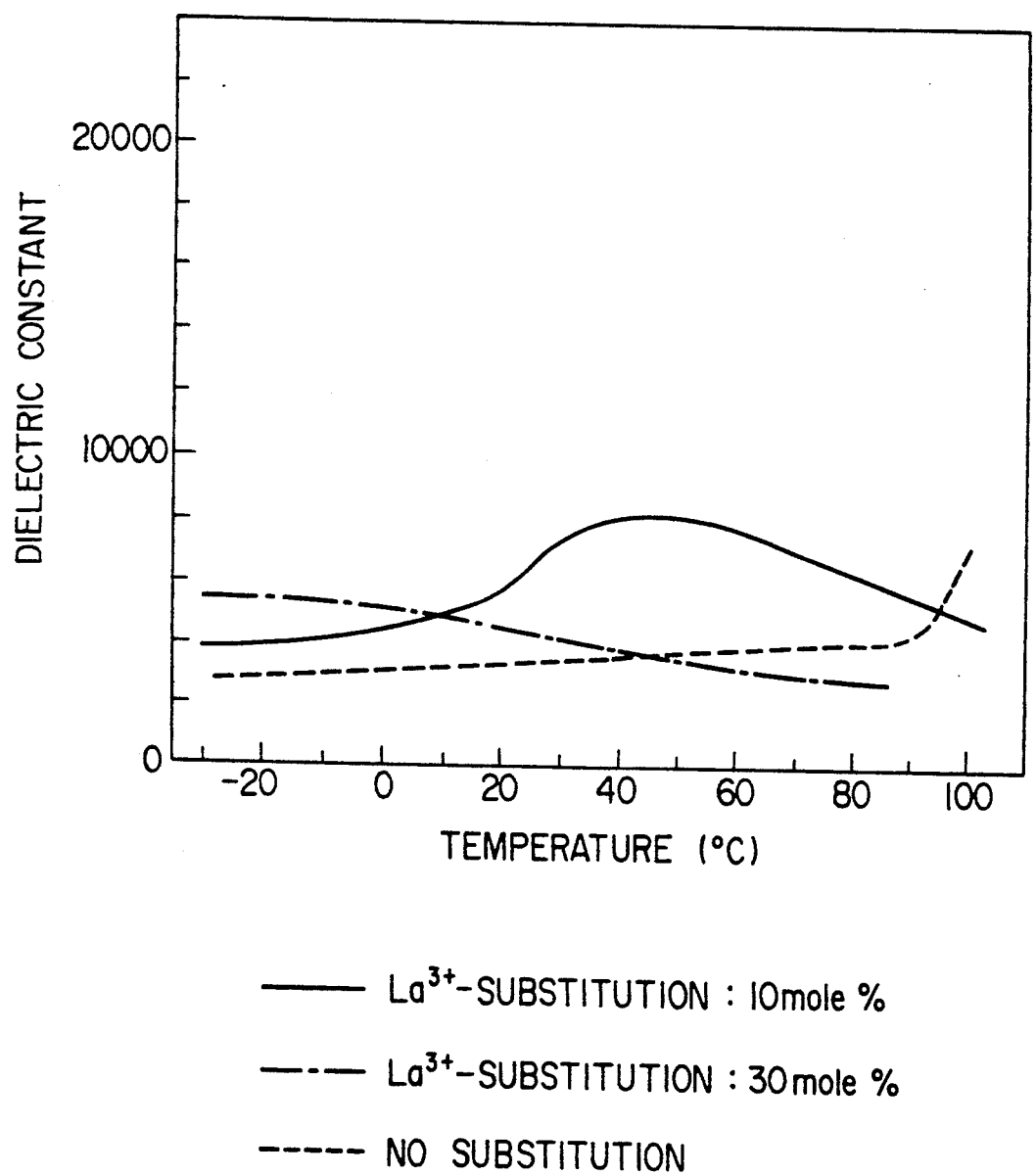
FIG. 8 is a graph showing the temperature-dependency of the dielectric constant, of a further embodiment of the ceramic composition according to the present invention in which x, y and z are 0.2, 0.5 and 0.3 respectively and the amount of La$^{3+}$-substitution is 0, 10 or 30 mole%.

Moreover, to make clear the effect of La$^{3+}$-substitution, there is shown, in FIG. 8, the temperature-dependncy of the dielectric constant of a ceramic composition whose compounding ratio (x, y, z) was (0.2, 0.5, 0.3) and in which the amount of La$^{3+}$-substitution was 0, 10 and 30 mole%.

TABLE 17

Compounding Ratios of Sample Nos. 61 to 80

| Sample No. | Main Constituent Compounding Ratio (Mole %) | | | Amount of Substitution (Mole %) |
|---|---|---|---|---|
| | Pb(Mg$_{\frac{1}{2}}$W$_{\frac{1}{2}}$)O$_3$ | Pb(Ni$_{\frac{1}{3}}$Nb$_{\frac{2}{3}}$)O$_3$ | PbTiO$_3$ | La |
| 61* | 69.3 | 1 | 29.7 | 0 |
| 62 | 69.3 | 1 | 29.7 | 0.01 |
| 63 | 69.3 | 1 | 29.7 | 10 |
| 64 | 69.3 | 1 | 29.7 | 30 |
| 65* | 69.3 | 1 | 29.7 | 32.5 |
| 66* | 49.5 | 1 | 49.5 | 0 |
| 67 | 49.5 | 1 | 49.5 | 0.01 |
| 68 | 49.5 | 1 | 49.5 | 10 |
| 69 | 49.5 | 1 | 49.5 | 30 |
| 70* | 49.5 | 1 | 49.5 | 32.5 |
| 71* | 19.5 | 35 | 45.5 | 0 |
| 72 | 19.5 | 35 | 45.5 | 0.01 |
| 73 | 19.5 | 35 | 45.5 | 10 |
| 74 | 19.5 | 35 | 45.5 | 30 |
| 75* | 19.5 | 35 | 45.5 | 32.5 |
| 76* | 10 | 50 | 40 | 0 |

TABLE 17-continued

Compounding Ratios of Sample Nos. 61 to 80

| Sample No. | Main Constituent Compounding Ratio (Mole %) | | | Amount of Substitution (Mole %) |
|---|---|---|---|---|
| | $Pb(Mg_{\frac{1}{2}}W_{\frac{1}{2}})O_3$ | $Pb(Ni_{\frac{1}{3}}Nb_{\frac{2}{3}})O_3$ | $PbTiO_3$ | La |
| 77 | 10 | 50 | 40 | 0.01 |
| 78 | 10 | 50 | 40 | 10 |
| 79 | 10 | 50 | 40 | 30 |
| 80* | 10 | 50 | 40 | 32.5 |

TABLE 18

Compounding Ratios of Sample Nos. 81 to 100

| Sample No. | Main Constituent Compounding Ratio (Mole %) | | | Amount of Substitution (Mole %) |
|---|---|---|---|---|
| | $Pb(Mg_{\frac{1}{2}}W_{\frac{1}{2}})O_3$ | $Pb(Ni_{\frac{1}{3}}Nb_{\frac{2}{3}})O_3$ | $PbTiO_3$ | La |
| 81* | 6 | 70 | 24 | 0 |
| 82 | 6 | 70 | 24 | 0.01 |
| 83 | 6 | 70 | 24 | 10 |
| 84 | 6 | 70 | 24 | 30 |
| 85* | 6 | 70 | 24 | 32.5 |
| 86* | 30 | 30 | 40 | 0 |
| 87 | 30 | 30 | 40 | 0.01 |
| 88 | 30 | 30 | 40 | 10 |
| 89 | 30 | 30 | 40 | 30 |
| 90* | 30 | 30 | 40 | 32.5 |
| 91* | 39 | 1 | 60 | 0 |
| 92 | 39 | 1 | 60 | 0.01 |
| 93 | 39 | 1 | 60 | 10 |
| 94 | 39 | 1 | 60 | 30 |
| 95* | 39 | 1 | 60 | 32.5 |
| 96* | 5 | 40 | 55 | 0 |
| 97 | 5 | 40 | 55 | 0.01 |
| 98 | 5 | 40 | 55 | 10 |
| 99 | 5 | 40 | 55 | 30 |
| 100* | 5 | 40 | 55 | 32.5 |

TABLE 19

Properties of Sample Nos. 61 to 80

| Sample No. | Specific Resistivity ($\Omega \cdot cm$) | Dielectric Constant (room temp.) | Variation of Dielectric Constant (%) | |
|---|---|---|---|---|
| | | | $-30°$ C. | $85°$ C. |
| 61* | $9.5 \times 10^{12}$ | 3060 | +35.2 | −42.8 |
| 62 | $1.1 \times 10^{13}$ | 2950 | +33.0 | −40.5 |
| 63 | $1.3 \times 10^{13}$ | 2710 | +28.5 | −35.1 |
| 64 | $2.5 \times 10^{13}$ | 2520 | +23.1 | −30.5 |
| 65* | $9.8 \times 10^{12}$ | 1800 | +23.3 | −29.8 |
| 66* | $2.5 \times 10^{12}$ | 4530 | −52.5 | −25.3 |
| 67 | $1.3 \times 10^{13}$ | 3520 | −50.5 | −24.5 |
| 68 | $1.8 \times 10^{13}$ | 3230 | −48.3 | −23.2 |
| 69 | $2.0 \times 10^{13}$ | 3010 | −42.1 | −20.5 |
| 70* | $3.5 \times 10^{12}$ | 2070 | −42.0 | −20.1 |
| 71* | $4.2 \times 10^{12}$ | 3450 | −56.5 | −12.8 |
| 72 | $1.5 \times 10^{13}$ | 2870 | −53.2 | −11.5 |
| 73 | $2.3 \times 10^{13}$ | 2650 | −48.5 | −10.8 |
| 74 | $2.6 \times 10^{13}$ | 2430 | −45.3 | −9.5 |
| 75* | $5.7 \times 10^{12}$ | 1950 | −44.5 | −8.7 |
| 76* | $4.5 \times 10^{12}$ | 5620 | −46.2 | −35.5 |
| 77 | $1.7 \times 10^{13}$ | 5320 | −43.1 | −32.1 |
| 78 | $2.3 \times 10^{13}$ | 4500 | −40.5 | −28.8 |
| 79 | $2.8 \times 10^{13}$ | 3200 | −33.7 | −24.1 |
| 80* | $6.3 \times 10^{12}$ | 2200 | −33.1 | −24.0 |

TABLE 20

Properties of Sample Nos. 81 to 100

| Sample No. | Specific Resistivity ($\Omega \cdot cm$) | Dielectric Constant (room temp.) | Variation of Dielectric Constant (%) | |
|---|---|---|---|---|
| | | | $-30°$ C. | $85°$ C. |
| 81* | $2.8 \times 10^{12}$ | 9250 | +45.2 | −43.8 |
| 82 | $2.5 \times 10^{13}$ | 9050 | −41.7 | −40.2 |
| 83 | $2.8 \times 10^{13}$ | 8200 | −37.8 | −36.5 |
| 84 | $3.0 \times 10^{13}$ | 6570 | −35.5 | −34.8 |
| 85* | $3.6 \times 10^{12}$ | 3200 | −34.8 | −34.2 |
| 86* | $3.5 \times 10^{12}$ | 9800 | −42.3 | −38.7 |
| 87 | $2.1 \times 10^{13}$ | 9260 | −39.7 | −35.5 |
| 88 | $2.5 \times 10^{13}$ | 8770 | −35.2 | −32.8 |
| 89 | $2.8 \times 10^{13}$ | 6070 | −33.6 | −28.8 |
| 90* | $5.6 \times 10^{12}$ | 4050 | −32.8 | −27.9 |
| 91* | $3.5 \times 10^{12}$ | 4800 | −65.3 | +25.5 |
| 92 | $2.0 \times 10^{13}$ | 5000 | −63.3 | +32.5 |
| 93 | $2.5 \times 10^{13}$ | 5250 | −53.2 | +10.5 |
| 94 | $2.8 \times 10^{13}$ | 5100 | −49.8 | −23.8 |
| 95* | $8.2 \times 10^{12}$ | 4700 | −48.5 | −22.5 |
| 96* | $1.2 \times 10^{12}$ | 6050 | −68.3 | +35.5 |
| 97 | $5.3 \times 10^{12}$ | 6200 | −55.3 | +27.6 |
| 98 | $7.5 \times 10^{12}$ | 7500 | −50.5 | +15.8 |
| 99 | $7.8 \times 10^{12}$ | 7300 | −49.8 | −13.2 |
| 100* | $3.3 \times 10^{12}$ | 7050 | −45.5 | −14.5 |

As seen from the data shown in Tables 11 to 16, the ceramic composition comprising a ternary composition: $Pb(Mg_{\frac{1}{3}}Nb_{\frac{2}{3}})O_3$-$Pb(Ni_{\frac{1}{3}}Nb_{\frac{2}{3}})O_3$-$PbTiO_3$ in which 0.01 to 30 mole% of lead ions ($Pb^{2+}$) were substituted with lanthanum ions ($La^{3+}$) is an excellent material for use in making multilayer ceramic capacitors having a high specific resistivity and a low variation of dielectric constant with temperature.

Further, as seen from the data listed in Tables 17 to 20, the ceramic composition comprising a ternary composition: $Pb(Mg_{\frac{1}{2}}W_{\frac{1}{2}})O_3$-$PbTiO_3$-$Pb(Ni_{\frac{1}{3}}Nb_{\frac{2}{3}})O_3$ in which 0.01 to 30 mole% of lead ions ($Pb^{2+}$) were substituted with lanthanum ions ($La^{3+}$) is likewise an excellent material for use in making multilayer ceramic capacitors having a high specific resistivity and a low variation of dielectric constant with temperature.

EXAMPLE 7

The same procedures used in Example 5 were repeated to give a dielectric powder which had a compounding ratio: (x, y, z) in the major constituent represented by $(Pb(Mg_{\frac{1}{3}}Nb_{\frac{2}{3}})O_3)_x(Pb(Ni_{\frac{1}{3}}Nb_{\frac{2}{3}})O_3)_y(PbTiO_3)_z$ of (0.5, 0.3, 0.2) and in which 10 mole% of $Pb^{2+}$ ions were substituted with $La^{3+}$ ions. The resulting dielectric powder was dispersed in an organic solvent, kneaded with an organic binder to give a slurry and the resulting slurry was formed into a film having a thickness of 40 μm according to the doctor blade technique currently used. Then a paste for internal electrode was printed on the film in accordance with the usual screen printing method, followed by stamping out, lamination, hot-pressing to give a multilayer body which was then cut into pieces having a desired shape to obtain green chips for capacitors. The resulting green chips were heated to desired temperatures to remove the binder and to fire and then silver paste was applied thereto to form external electrodes.

The capacitance of the multilayer ceramic capacitor thus obtained was determined at room temperature while a DC bias of 0 to 50V was applied to the multilayer ceramic capacitor using a digital multimeter. The results thus obtained are plotted in FIG. 9.

EXAMPLE 8

The same procedures used in Example 5 were repeated to give a dielectric powder which had a compounding ratio: (x, y, z) in the major constituent represented by $(Pb(Mg_{\frac{1}{2}}W_{\frac{1}{2}})O_3)_x(PbTiO_3)_y(Pb(Ni_{\frac{1}{3}}Nb_{\frac{2}{3}})O_3)_z$ of (0.2, 0.5, 0.3) and in which 10 mole% of $Pb^{2+}$ ions were substituted with $La^{3+}$ ions.

Further, in the same manner used in Example 7, a multilayer ceramic capacitor was produced and the behavior thereof upon applying a DC bias was determined in the same manner described in Example 7. The results obtained are plotted in FIG. 10.

COMPARATIVE EXAMPLE 3

The same procedures used in Example 7 were repeated except for using a composition which had a compounding ratio: (x, y, z) in the major constituent represented by $(Pb(Ni_{\frac{1}{3}}Nb_{\frac{2}{3}})O_3)_x(Pb(Ni_{\frac{1}{3}}Nb_{\frac{2}{3}})O_3)_y(PbTiO_3)_z$ of (0.2, 0.6, 0.2) and free of $La^{3+}$-substitution to give a capacitor and the capacitance thereof upon applying a DC bias was determined in the same manner described in Example 7. The results obtained are plotted in FIG. 9 together with the results obtained in Example 7.

COMPARATIVE EXAMPLE 4

The same procedures used in Example 7 were repeated except for using a composition which had a compunding ratio: (x, y, z) in the major constituent represented by $(Pb(Mg_{\frac{1}{2}}W_{\frac{1}{2}})O_3)_x(PbTiO_3)_y(Pb(Ni_{\frac{1}{3}}Nb_{\frac{2}{3}})O_3)_z$ of (0.3, 0.4, 0.3) and free of substitution of $Pb^{2+}$ to give a capacitor and the capacitance thereof upon applying a DC bias was determined in the same manner described in Example 7. The results obtained are plotted in FIG. 10 together with the results obtained in Example 8.

Figure 9:
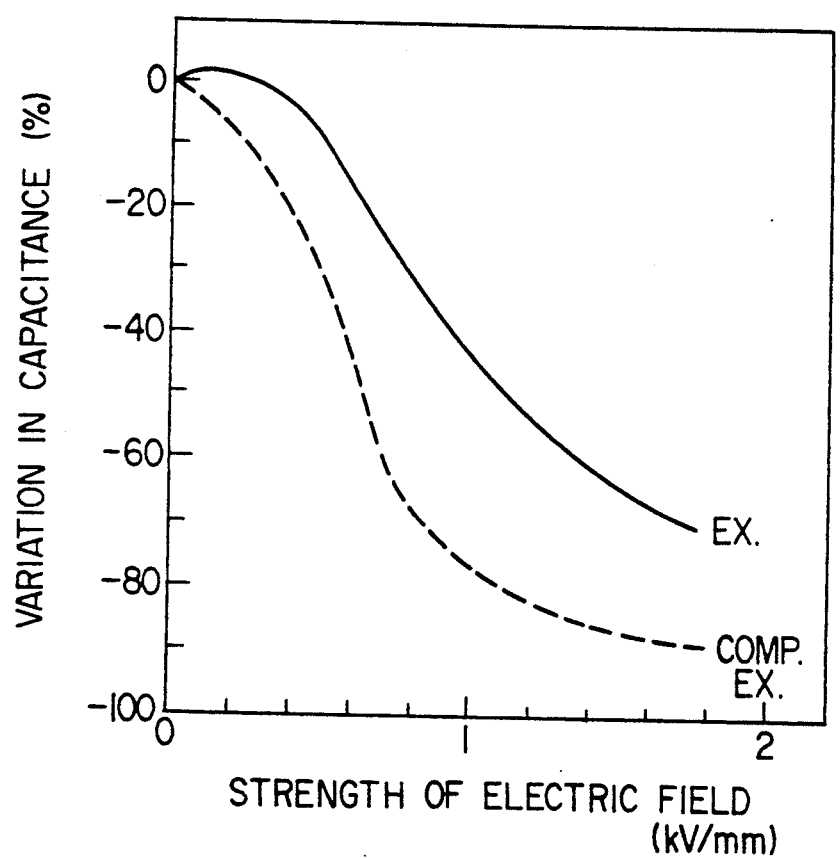
FIG. 9 is a graph in which the rate of variation in capacitance observed when a DC bias is applied to a multilayer ceramic capacitor is plotted against the strength of DC electric field per layer of the capacitor (as determined in Example 7 and Comparative Example 3)
Figure 10:
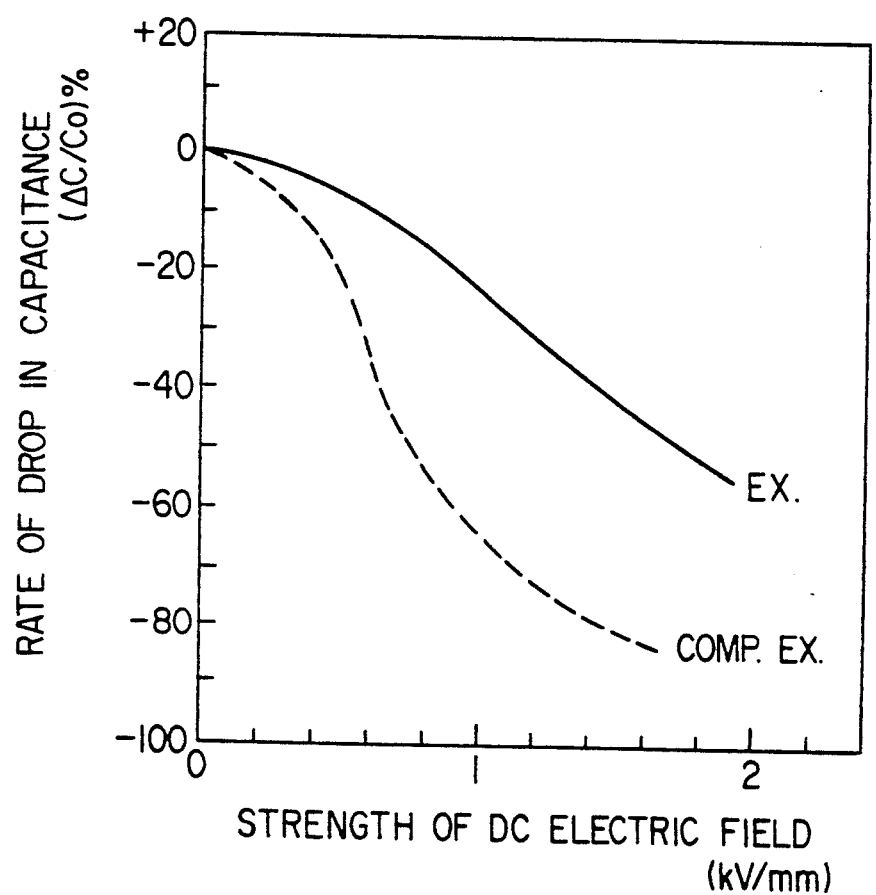
FIG. 10 is a graph in which the rate of variation in capacitance observed when a DC bias is applied to a multilayer ceramic capacitor is plotted against the strength of DC electric field per layer of the capacitor (as determined in Example 8 and Comparative Example 4)

The results shown in FIGS. 9 and 10 clearly indicate that the capacitors obtained from the ceramic composition of the present invention in which lead ions ($Pb^{2+}$) had been substituted with lanthanum ions ($La^{3+}$) show the behavior upon application of a DC bias superior to those for the capacitors obtained using the compositions of Comparative Examples 3 and 4.

EXAMPLE 9

There were used, as starting materials, lead oxide (PbO), tungsten oxide ($WO_3$), magnesium oxide (MgO), niobium oxide ($Nb_2O_5$), nickel oxide (NiO), titanium oxide ($TiO_2$) and calcium carbonate ($CaCO_3$) and these starting materials were weighed so as to satisfy the compounding ratio as shown in Tables 21 to 22. These weighed starting materials were subjected to wet-milling and mixed in a ball mill, calcined at 800° to 850° C., followed by re-milling of the resulting powder in a ball mill, filtration, drying, addition of an organic binder, sizing and pressing to give cylindrical samples having a diameter of about 16 mm and a thickness of about 10 mm as well as two disk-like samples having a diameter of about 16 mm and a thickness of about 2 mm. Then these samples having desired compositions were fired at a temperature ranging from 950° to 1050° C. for one hour. Silver electrodes were print=d onto both faces of the fired disk-like samples at 600° C. and the capacitance and dielectric loss thereof were determined at a frequency of 1 KHz, a voltage of 1 V r.m.s. and room temperature using a digital LCR meter to obtain dielectric constants and the variation thereof with temperature.

Tables 21 to 24 show the compounding ratio: x, y and z of the major constituent: $(Pb(Mg_{\frac{1}{2}}W_{\frac{1}{2}})O_3)_x(PbTiO_3)_y(Pb(Ni_{\frac{1}{3}}Nb_{\frac{2}{3}})O_3)_z$ of the resulting ceramic composition, the amount of $Ca^{2+}$-substitution, dielectric constant at room temperature, dielectric loss and variations of dielectric constants determined at −30° C. and 85° C. (expressed in terms of a value relative to a dielectric constant observed at 20° C.). In these Tables, asterisk (*) means that the amount of $Ca^{2+}$-substitution is beyond the range defined in the present invention and double asterisk (**) means that the major constituent of the corresponding sample is beyond the range defined in the present invention.

Figure 11:
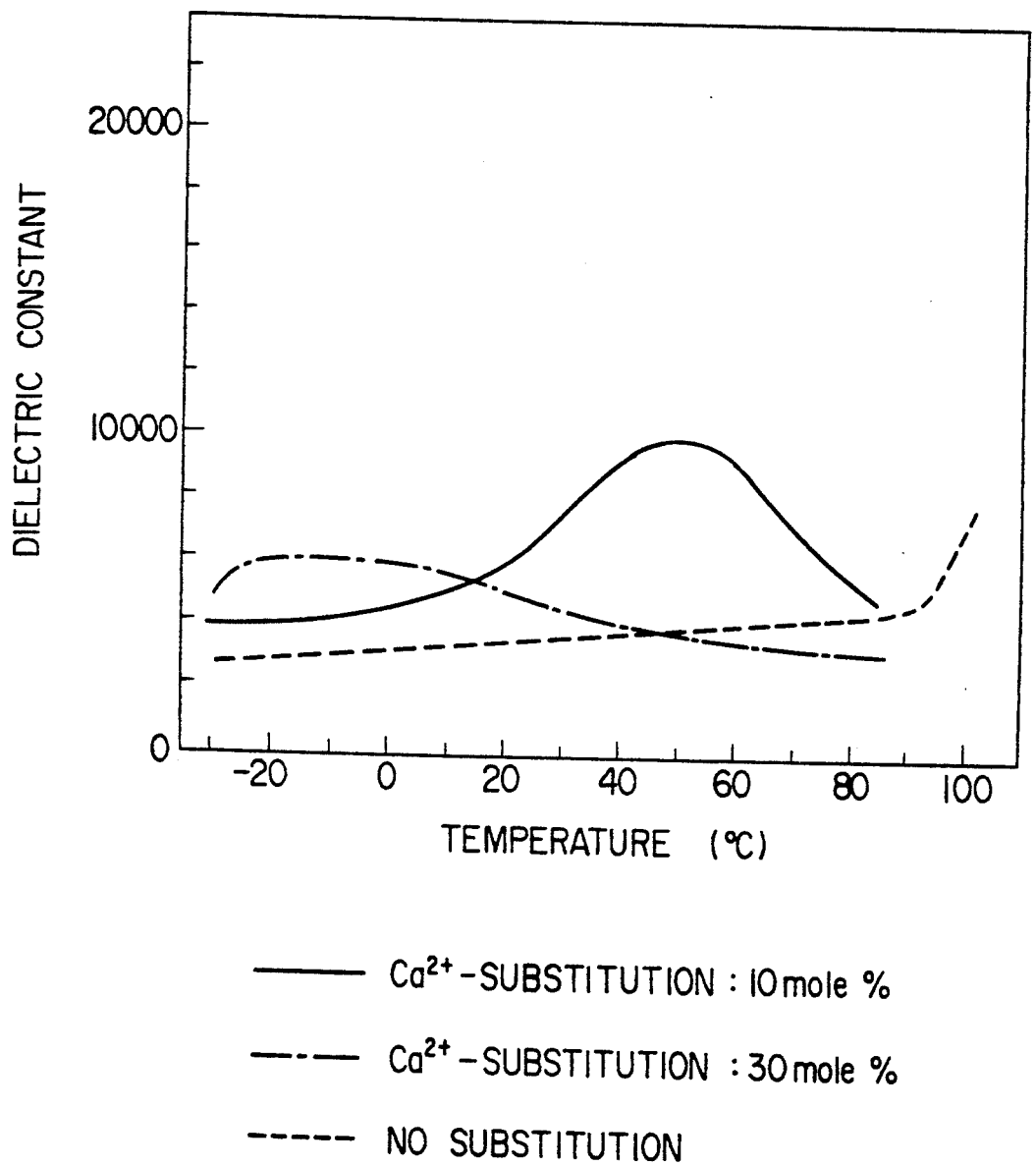
FIG. 11 is a graph showing the temperature-dependency of the dielectric constant of a further embodiment of the ceramic composition according to the present invention in which x, y and z are 0.2, 0.5 and 0.3 respectively and the amount of Ca$^{2+}$-substitution is 0, 10 or 30 mole%.

Moreover, to make clear the effect of the $Ca^{2+}$-substitution, there is shown, in FIG. 11, the temperature-dependency of the dielectric constant of a ceramic composition whose compounding ratio (x, y, z) was (0.2, 0.5, 0.3) and in which the amount of $Ca_{2+}$-substitution was 0, 10 and 30 mole%.

As seen from the data shown in Tables 21 to 24, the ceramic composition of the present invention comprising a ternary composition: $Pb(Mg_{\frac{1}{2}}W_{\frac{1}{2}})O_3$-$PbTiO_3$-$Pb(Ni_{\frac{1}{3}}Nb_{\frac{2}{3}})O_3$ in which 0.01 to 30 mole% of lead ions ($Pb^{2+}$) were substituted with calcium ions ($Ca2+$) has a high dielectric constant and a low variation of dielectric constant with temperature and can satisfy the Y5U characteristics (−30 to 85° C.; +22%, −56%) or the Y5T characteristics (−30° to 85° C.; +22%, −33%) as defined in the EIA Standards. Furthermore, the ceramic composition of the present invention can be sintered at a low temperature of not more than 1050° C. and, therefore, when it is used to form a multilayer ceramic capacitor, a cheap silver . palladium, alloy can be used for forming internal electrodes thereof.

TABLE 21

Compounding Ratios of Sample Nos. 1 to 20

| Sample No. | Main Constituent Compounding Ratio (Mole %) | | | Amount of Substitution (Mole %) |
|---|---|---|---|---|
| | Pb(Mg$_\frac{1}{2}$W$_\frac{1}{2}$)O$_3$ | Pb(Ni$_\frac{1}{3}$Nb$_\frac{2}{3}$)O$_3$ | PbTiO$_3$ | Ca |
| 1* | 69.3 | 1.0 | 29.7 | 0 |
| 2 | 69.3 | 1.0 | 29.7 | 0.01 |
| 3 | 69.3 | 1.0 | 29.7 | 2 |
| 4** | 40.0 | 35.0 | 25.0 | 0.01 |
| 5** | 40.0 | 35.0 | 25.0 | 2 |
| 6* | 6.0 | 70.0 | 24.0 | 0 |
| 7 | 6.0 | 70.0 | 24.0 | 2 |
| 8 | 6.0 | 70.0 | 24.0 | 5 |
| 9* | 5.0 | 40.0 | 55.0 | 0 |
| 10 | 5.0 | 40.0 | 55.0 | 30 |
| 11* | 5.0 | 40.0 | 55.0 | 32.5 |
| 12* | 20.0 | 30.0 | 50.0 | 0 |
| 13 | 20.0 | 30.0 | 50.0 | 10 |
| 14 | 20.0 | 30.0 | 50.0 | 30 |
| 15** | 15.0 | 25.0 | 60.0 | 30 |
| 16** | 15.0 | 25.0 | 60.0 | 32.5 |
| 17* | 39.0 | 1.0 | 60.0 | 0 |
| 18 | 39.0 | 1.0 | 60.0 | 10 |
| 19 | 39.0 | 1.0 | 60.0 | 20 |
| 20* | 30.0 | 30.0 | 40.0 | 0 |

TABLE 22

Compounding Ratios of Sample Nos. 21 to 25

| Sample No. | Main Constituent Compounding Ratio (Mole %) | | | Amount of Substitution (Mole %) |
|---|---|---|---|---|
| | Pb(Mg$_\frac{1}{2}$W$_\frac{1}{2}$)O$_3$ | Pb(Ni$_\frac{1}{3}$Nb$_\frac{2}{3}$)O$_3$ | PbTiO$_3$ | Ca |
| 21 | 30.0 | 30.0 | 40.0 | 0.01 |
| 22 | 30.0 | 30.0 | 40.0 | 5 |
| 23* | 10.0 | 50.0 | 40.0 | 0 |
| 24 | 10.0 | 50.0 | 40.0 | 2 |
| 25 | 10.0 | 50.0 | 40.0 | 10 |

TABLE 23

Properties of Sample Nos. 1 to 20

| Sample No. | Specific Resistivity (Ω·cm) | Dielectric Constant (room temp.) | Variation of Dielectric Constant (%) | |
|---|---|---|---|---|
| | | | −30° C. | 85° C. |
| 1* | 2.8 × 10$^{12}$ | 9250 | +45.2 | −43.8 |
| 2 | 1.2 × 10$^{13}$ | 3240 | +29.6 | −41.7 |
| 3 | 2.3 × 10$^{13}$ | 3410 | +22.3 | −39.6 |
| 4** | 4.7 × 10$^{12}$ | 3720 | +58.6 | −47.5 |
| 5** | 6.5 × 10$^{12}$ | 3140 | +52.4 | −41.0 |
| 6* | 2.8 × 10$^{12}$ | 9250 | −45.2 | −43.8 |
| 7 | 3.4 × 10$^{12}$ | 8580 | −29.0 | −41.1 |
| 8 | 5.1 × 10$^{12}$ | 6740 | +15.3 | −31.4 |
| 9* | 1.2 × 10$^{12}$ | 6050 | −68.3 | +35.5 |
| 10 | 4.7 × 10$^{12}$ | 6230 | −41.9 | −4.6 |
| 11* | 1.6 × 10$^{12}$ | 4860 | −48.6 | +8.3 |
| 12* | 2.9 × 10$^{12}$ | 3950 | −34.6 | +11.5 |
| 13 | 4.6 × 10$^{12}$ | 5740 | −30.2 | −15.1 |
| 14 | 6.2 × 10$^{12}$ | 5090 | −3.8 | −33.2 |
| 15** | 6.8 × 10$^{12}$ | 3740 | −28.6 | +45.5 |
| 16** | 3.3 × 10$^{12}$ | 3500 | −25.6 | +54.6 |
| 17* | 3.5 × 10$^{12}$ | 4800 | −65.3 | +25.5 |
| 18 | 5.1 × 10$^{12}$ | 6930 | −39.4 | +26.4 |
| 19 | 6.9 × 10$^{12}$ | 7160 | −29.5 | −17.8 |
| 20* | 2.3 × 10$^{12}$ | 11200 | −40.8 | −38.5 |

TABLE 24

Properties of Sample Nos. 21 to 25

| Sample No. | Specific Resistivity (Ω·cm) | Dielectric Constant (room temp.) | Variation of Dielectric Constant (%) | |
|---|---|---|---|---|
| | | | −30° C. | 85° C. |
| 21 | 2.6 × 10$^{12}$ | 11850 | +40.2 | −41.3 |
| 22 | 4.5 × 10$^{12}$ | 7380 | +12.4 | −29.5 |
| 23* | 1.6 × 10$^{12}$ | 5350 | −29.6 | +78.8 |
| 24 | 2.5 × 10$^{12}$ | 6200 | −24.5 | +47.5 |
| 25 | 4.3 × 10$^{12}$ | 10060 | −35.4 | −44.6 |

EXAMPLE 10

The same procedures used in Example 9 were repeated to give a dielectric powder which had a compounding ratio: (x, y, z) in the major constituent represented by (Pb(Mg$_\frac{1}{2}$W$_\frac{1}{2}$)O$_3$)$_x$(PbTiO$_3$)$_y$(Pb(Ni$_\frac{1}{3}$Nb$_\frac{2}{3}$)O$_3$)$_z$ of (0.3, 0.5, 0.2) and in which 10 mole% of Pb$^{2+}$ ions were substituted with Ca$^{2+}$ ions. The resulting dielectric powder was dispersed in an organic solvent, kneaded with an organic binder to give a slurry and the resulting slurry was formed into a film having a thickness of 40 μm according to the doctor blade technique currently used. Then a paste for internal electrode was printed on the film in accordance with the usual screen printing method, followed by stamping out, lamination, hot-pressing to give a multilayer body which was then cut into pieces having a desired shape to obtain green chips for capacitors. The resulting green chips were heated to desired temperatures to remove the binder and to fire and then silver paste was applied thereto to form external electrodes.

The capacitance of the multilayer ceramic capacitor thus obtained was determined at room temperature while a DC bias of 0 to 50V was applied to the multilayer ceramic capacitor using a digital multimeter. The results thus obtained are plotted in FIG. 12.

COMPARATIVE EXAMPLE 5

The same procedures used in Example 10 were repeated except for using a composition which had a compounding ratio (x, y, z) in the major constituent represented by $(Pb(Mg_{\frac{1}{3}}W_{\frac{1}{3}})O_3)_x(PbTiO_3)_y(Pb(Ni_{\frac{1}{3}}Nb_{\frac{2}{3}})O_3)_z$ of (0.3, 0.4, 0.3) and free of substitution of $Pb^{2+}$ and $Ca^{2+}$ to give a capacitor and the capacitance thereof upon applying a DC bias was determined in the same manner described in Example 10. The results obtained are plotted in FIG. 12 together with the those obtained in Example 10.

Figure 12:
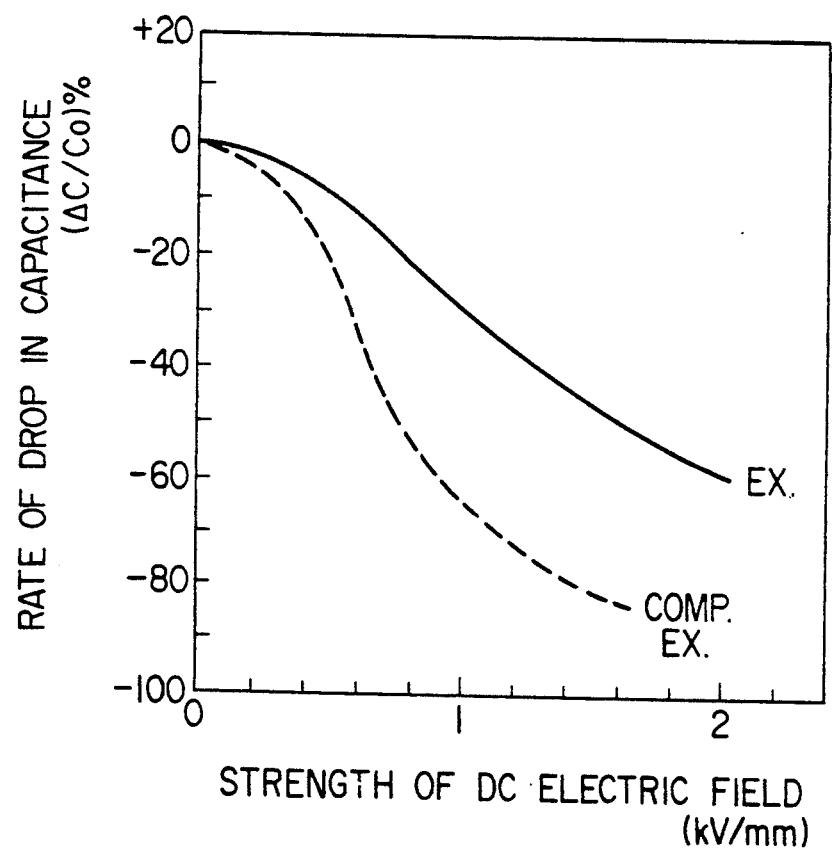
FIG. 12 is a graph is which the rate of variation in capacitance observed when a DC bias is applied to a multilayer ceramic capacitor is plotted against the strength of DC electric field per layer of the capacitor (as determined in Example 10 and Comparative Example 5).

The results shown in FIG. 12 clearly indicate that the capacitors obtained from the ceramic composition of the present invention in which lead ions ($Pb^{2+}$) are substituted with calcium ions ($Ca^{2+}$) show the behavior upon application of a DC bias superior to that for the capacitor obtained using the composition of Comparative Example 5.

Incidentally, the Curie points of ceramic compositions whose compounding ratios of the major constituents are beyond the range defined in the present invention are deviated from room temperature to the temperature side extremely higher or lower than the room temperature and, therefore, such compositions suffer from such problems that the dielectric constants thereof at room temperature are very low and that the temperature-dependency of the dielectric constant is high within the practical temperature range. Moreover, if the amount of lanthanum manganese niobate ($La(Mn_{\frac{2}{3}}Nb_{\frac{1}{3}})O_3$) to be incorporated into the ceramic composition is beyond the range defined in the present invention, the resulting composition is not applicable as a material for use in making capacitors since it suffers from such a problem that the depressing effect is too high and the capacitance is low or that the bending strength thereof is lowered. In addition, if the amount of the $La^{3+}$-substitution is beyond the range defined in the present invention, the resulting composition is not applicable as a material for use in making capacitors since it suffers from such a problem that the depressing effect is too high and the capacitance is low, that the Curie point of the resulting ceramic composition is greatly deviated from room temperature and accordingly the dielectric constant thereof at the room temperature is very low or that the firing temperature must be raised to a high level (if the composition is fired at a temperature range of from 1050° to 1100° C., it is insufficiently fired and this leads to a decrease in the specific resistance). Further, if the amount of the $Ca^{2+}$-substitution is beyond the range defined in the present invention, the resulting composition is not applicable as a material for use in making capacitors since it suffers from such a problem that the depressing effect is too high and the capacitance is lowered, that the Curie point of the resulting ceramic composition is greatly deviated from room temperature and accordingly the dielectric constant thereof at the room temperature is very low or that the firing temperature must be raised (if the composition is fired at 1050° C., it is insufficiently fired and this leads to a decrease in the specific resistivity).

The ceramic composition of the present invention has a low temperature-dependency of the dielectric constant, which can be achieved by incorporating lanthanum manganese niobate ($La(Mn_{\frac{2}{3}}Nb_{\frac{1}{3}})O_3$) into the major constituent thereof: $(Pb(Mg_{\frac{1}{3}}W_{\frac{1}{3}})O_3)_x[PbTiO_3]_y(Pb(Ni_{\frac{1}{3}}Nb_{\frac{2}{3}})O_3)_z$ or $(Pb(Mg_{\frac{1}{3}}Nb_{\frac{2}{3}})O_3)_x(Pb(Ni_{\frac{1}{3}}Nb_{\frac{2}{3}})O_3)_y(PbTiO_3)_z$ or through the substitution of $Pb^{2+}$ ions in the major constituent with a predetermined amount of $La^{3+}$ or $Ca^{2+}$ ions. Further, the ceramic composition of the present invention shows a low decrease in the capacitance upon application of a DC bias. Thus, the ceramic composition makes it possible to provide a multilayer ceramic capacitor having excellent temperature-dependency of the dielectric constant and high reliability. Further, the firing temperature thereof is not more than 1050° to 1100° C. and this allows the use of silver-palladium alloys abundant in silver as materials for internal electrodes of capacitors and, in turn, allows the reduction in expeses for the production of internal electrodes. The composition is likewise applicable to such a multilayer ceramic capacitor as a power source-smoothing capacitor which is used while applying a DC bias since the decrease in the capacitance upon application of a DC bias is relatively small a has already been discussed above. Furthermore, the composition can provide a product having a high bending strength when lanthanum manganese niobate is incorporated, while if $Pb^{2+}$ ions are substituted with $La^{3+}$ or $Ca^{2+}$ ions, the composition can provide a product having a high specific resistivity.

We claim:

1. A ceramic composition comprising, as a major constituent, a ternary system essentially consisting of lead magnesium niobate $Pb(Mg_{\frac{1}{3}}Nb_{\frac{2}{3}})O_3$, lead nickel niobate $Pb(Ni_{\frac{1}{3}}Nb_{\frac{2}{3}})O_3$ and lead titanate $PbTiO_3$ and being expressed by the following general formula: $(Pb(Mg_{\frac{1}{3}}Nb_{\frac{2}{3}})O_3)_x\ (Pb(Ni_{\frac{1}{3}}Nb_{\frac{2}{3}})O_3)_y\ (PbTiO_3)_z$ wherein the subscripts x, y and z satisfy the following relation; $x+y+z=1.0$ and fall within the range defined by and be on the line segments joining the following seven points (a) to (g) which are given by the coordinates:

| | | | |
|---|---|---|---|
| (x = 0.10, | y = 0.70, | z = 0.20) | (a) |
| (x = 0.10, | y = 0.475, | z = 0.425) | (b) |
| (x = 0.625, | y = 0.05, | z = 0.325) | (c) |
| (x = 0.75, | y = 0.05, | z = 0.20) | (d) |
| (x = 0.75, | y = 0.15, | z = 0.10) | (e) |
| (x = 0.50, | y = 0.40, | z = 0.10) | (f) |
| (x = 0.15, | y = 0.70, | z = 0.15) | (g) | on the triangular ternary-system diagram; and, as an additive, 0.01 to 10 mole% of lanthanum manganese niobate $La(Mn_{\frac{2}{3}}Nb_{\frac{1}{3}})O_3$.

2. The ceramic composition of claim 1 wherein the amount of lanthanum manganese niobate ranges from 2 to 8 mole%.

3. A ceramic composition comprising, as a major, constituent, a ternary system essentially consisting of lead magnesium tungstate ($Pb(MG_{\frac{1}{3}}W_{\frac{1}{3}})O_3$), lead titanate $PbTiO_3$ and lead nickel niobate $Pb(Ni_{\frac{1}{3}}Nb_{\frac{2}{3}})O_3$, and being expressed by the following general formula: $(Pb(Mg_{\frac{1}{3}}W_{\frac{1}{3}})O_3)_x(PbTiO_3)_y,\ (Pb(Ni_{\frac{1}{3}}Nb_{\frac{2}{3}})O_3)_z$ wherein the subscripts x, y, and z satisfy the following relation: $x+y+z=1.0$ and fall within the range defined by and be on the line segments joining the following four points (h) to (k) which are given by the coordinates:

| | | | |
|---|---|---|---|
| (x = 0.693, | y = 0.297, | z = 0.01) | (h) |
| (x = 0.39, | y = 0.60, | z = 0.01) | (i) |
| (x = 0.05, | y = 0.55, | z = 0.40) | (j) |

| (x = 0.06, | y = 0.24, | z = 0.70) | (k) | on the triangular ternary-system diagram; and, as an additive, 0.10 to 10 mole% of lanthanum manganese niobate $(La(Mn_{\frac{2}{3}}Nb_{\frac{1}{3}})O_3)$.

4. The ceramic composition of claim 3 wherein the amount of lanthanum manganese niobate ranges from 2 to 8 mole%.

5. A ceramic composition comprising, as a major constituent, a ternary system essentially consisting of lead magnesium niobate $Pb(Ni_{\frac{1}{3}}Nb_{\frac{2}{3}})O_3$ and lead titanate $PbTiO_3$ and being expressed by the following general formula: $(Pb(Mg_{\frac{1}{3}}Nb_{\frac{2}{3}})O_3)_x (Pb(Ni_{\frac{1}{3}}Nb_{\frac{2}{3}})O_3)_y (PbTiO_3)_z$ wherein the subscripts x, y and z satisfy the following relation: $x+y+z=1.0$ and fall within the range defined by and be on the line segments joining the following seven points (a) to (g) which are given by the coordinates:

| (x = 0.10, | y = 0.70, | z = 0.20) | (a) |
| (x = 0.10, | y = 0.475, | z = 0.425) | (b) |
| (x = 0.625, | y = 0.05, | z = 0.325) | (c) |
| (x = 0.75, | y = 0.05, | z = 0.20) | (d) |
| (x = 0.75, | y = 0.15, | z = 0.10) | (e) |
| (x = 0.50, | y = 0.40, | z = 0.10) | (f) |
| (x = 0.15, | y = 0.70, | z = 0.15) | (g) | on the triangular ternary-system diagram; and in which 0.01 to 30 mole% of lead ions ($Pb^{2+}$) of the major constituent are substituted with lanthanum ions ($La^{+3}$).

6. The ceramic composition of claim 5 wherein the amount of $La^{3+}$-substitution ranges from 2 to 20 mole%.

7. A ceramic composition, as a major constituent, a ternary system essentially consisting of lead magnesium tungstate $Pb(Mg_{\frac{1}{2}}W_{\frac{1}{2}})O_3$, lead titanate $PbTiO_3$ and lead nickel niobate $Pb(Ni_{\frac{1}{3}}Nb_{\frac{2}{3}})O_3$ and being expressed by the following general formula: $(Pb(Mg_{\frac{1}{2}}W_{\frac{1}{2}})O_3)_x (PbTiO_3)_y (Pb(Ni_{\frac{1}{3}}Nb_{\frac{2}{3}})O_3)_z$ wherein the subscripts x, y and z satisfy the following relation: $x+y+z=1.0$ and fall within the range defined by and be on the line segments joining the following four points (h) to (k) which are given by the coordinates:

| (x = 0.693, | y = 0.297, | z = 0.01) | ... (h) |
| (x = 0.39, | y = 0.60, | z = 0.01) | ... (i) |
| (x = 0.05, | y = 0.55, | z = 0.40) | ... (j) |
| (x = 0.06, | y = 0.24, | z = 0.70) | ... (k) | on the triangular ternary-systems diagram; and in which 0.01 to 30 mole% of lead ions ($Pb^{2+}$) of the major constituent are substituted with lanthanum ions ($La^{3+}$).

8. The ceramic composition of claim 7 wherein the amount of $La^{3+}$-substitution ranges from 2 to 20 mole%.

9. A ceramic composition comprising, as a major constituent, a ternary system essentially consisting of lead magnesium tungstate $Pb(Mg_{\frac{1}{2}}W_{\frac{1}{2}})O_3$, lead titanate $PbTiO_3$ and lead nickel niobate $Pb(Ni_{\frac{1}{3}}Nb_{\frac{2}{3}})O_3$ and being expressed by the following general formula: $(Pb(Mg_{\frac{1}{2}}W_{\frac{1}{2}})O_3)_x (PbTiO_3)_y (Pb(Ni_{\frac{1}{3}}Nb_{\frac{2}{3}})O_3)_z$ wherein the subscripts x, y and z satisfy the following relation: $x+y+z=1.0$ and fall within the range defined by and be on the line segments joining the following four points (h) to (k) which are given by the coordinates:

| (x = 0.693, | y = 0.297, | z = 0.01) | ... (h) |
| (x = 0.39, | y = 0.60, | z = 0.01) | ... (i) |
| (x = 0.05, y = 0.55, | z = 0.40) | | ... (j) |
| (x = 0.06, | y = 0.24, | z = 0.70) | ... (k) | on the triangular ternary-system diagram; and in which 0.01 to 30 mole% of lead ions ($Pb^{2+}$) are substituted with calcium ions ($Ca^{2+}$).

10. The ceramic composition of claim 9 wherein the amount of the $Ca^{2+}$-substitution ranges from 2 to 20 mole%.

* * * * *

UNITED STATES PATENT AND TRADEMARK OFFICE
CERTIFICATE OF CORRECTION

PATENT NO. : 5,219,810
DATED : June 15, 1993
INVENTOR(S) : Furuya et al.

It is certified that error appears in the above-indentified patent and that said Letters Patent is hereby corrected as shown below:

Claim 3, col. 26, line 54, delete "," (second occurrence).

Claim 7, col. 28, line 12, change "systems" to --system--.

Claim 9, col. 28, lines 32-33, change
"(x = 0.05, y =   z = 0.40      ...(j)
 0.55,"

to

--(x = 0.05,  y = 0.55,  z = 0.40)    ...(j)--.

Signed and Sealed this

First Day of March, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,219,810

DATED : June 15, 1993

INVENTOR(S) : Mitsuru FURUYA, Toru MORI and Atsushi OCHI

It is certified that error appears in the above-indentified patent and that said Letters Patent is hereby corrected as shown below:

Title Page:
In Item [30], Foreign Application Priority Data, please insert --November 28, 1991 [JP] Japan ......... 3-337865--.

Signed and Sealed this

Twenty-second Day of November, 1994

Attest:

BRUCE LEHMAN

*Attesting Officer*     *Commissioner of Patents and Trademarks*